(12) United States Patent
di Carimate et al.

(10) Patent No.: US 8,596,670 B2
(45) Date of Patent: Dec. 3, 2013

(54) STROLLER

(76) Inventors: Ascanio Carimati di Carimate, Milan (IT); Richard Wyant, Philipsburg, NJ (US); Andrew Serbinski, Annandale, NJ (US)

( * ) Notice: Subject to any disclaimer, the term of this patent is extended or adjusted under 35 U.S.C. 154(b) by 703 days.

(21) Appl. No.: 12/922,284

(22) Filed: Jun. 18, 2010

(65) Prior Publication Data
US 2013/0049331 A1 Feb. 28, 2013

(51) Int. Cl.
  *B62B 9/00* (2006.01)
  *B62B 9/10* (2006.01)
  *B62B 9/12* (2006.01)

(52) U.S. Cl.
  USPC ........ 280/650; 280/642; 280/647; 280/47.38; 280/47.4; 280/47.41

(58) Field of Classification Search
  USPC .......... 280/642, 647, 650, 47.38, 47.4, 47.41, 280/79.2
  See application file for complete search history.

(56) References Cited

U.S. PATENT DOCUMENTS

| | | | | |
|---|---|---|---|---|
| 4,763,911 A | * | 8/1988 | Gebhard et al. | 280/37 |
| 5,356,172 A | * | 10/1994 | Levy et al. | 280/650 |
| 5,395,154 A | * | 3/1995 | Wang | 297/130 |
| 5,593,173 A | * | 1/1997 | Williamson | 280/642 |
| 6,431,647 B2 | * | 8/2002 | Yamazaki | 297/256.12 |
| 2006/0214395 A1 | * | 9/2006 | Ageneau | 280/642 |
| 2007/0085303 A1 | * | 4/2007 | Cheng | 280/642 |
| 2009/0302578 A1 | * | 12/2009 | White et al. | 280/642 |

* cited by examiner

*Primary Examiner* — Hau Phan
*Assistant Examiner* — Bryan Evans
(74) *Attorney, Agent, or Firm* — Kenneth P. Glynn, Esq.; Deirdra M. Meagher, Esq.

(57) ABSTRACT

A folding stroller with changeable seating positions two infants or children is provided. The seating positions for two children may include side-by-side, with the seats positioned to be transverse to the direction of travel of the stroller, with seats facing the same or facing in opposite directions. Seating positions may also include in-line front-to-rear, facing forward or backward; side-by-side facing forward or backward. At least one seat may be provided with a reclining mechanism in which the seat may be reclined between a first position and a second position such that the center of mass of the seat remains substantially aligned with a vertical axis of the stroller.

21 Claims, 22 Drawing Sheets

STROLLER

FIELD OF THE INVENTION

The present invention relates generally to a transportation apparatus in which support surfaces are provided for at least one occupant. More particularly, the present invention relates to strollers for infants or children, and more particularly to a double stroller that has been reconfigured to fit within the dimensional footprint of a conventional single stroller and which provides for multiple seating positions for at least one infant or child, resulting in a stroller which is much more amenable for use in an urban environment where more restricted space conditions are encountered (e.g. such as aisle ways in public transportation systems, buildings and in congested walkways and passageways).

BACKGROUND OF THE INVENTION

Various types of strollers exist for infants or children (hereafter "children") which may provide seating for one or two children. Typically, strollers for two children are referred to as dual strollers, or tandem strollers, the differentiation depending upon the seating configuration.

Prior strollers provided seating for two children in either a front-to-rear configuration or a side-by-side configuration. Strollers with the seats along the longitudinal axis of the stroller, i.e., front-to-rear configuration, are commonly known as tandem strollers, while those with the seats in the transverse direction across the width of the stroller, i.e., side-by-side orientation, are referred to as a dual stroller. This convention will be used throughout this disclosure unless otherwise indicated.

Longitudinally aligned, or in-line, tandem strollers are disclosed, for example, in U.S. Pat. Nos. 5,221,106 and 7,614,640. The '106 patent discloses a typical "umbrella stroller" configured with seating for two children facing forward. An umbrella stroller, as disclosed by the '106 patent, folds in half lengthwise in a scissor fashion, for storage. In use, a spreader bar mechanism maintains the two halves separated.

The '640 patent discloses a versatile utility stroller in a dual configuration with seats in a longitudinal, forward-facing orientation. Upon activation of a folding mechanism, the frame drops downward, toward the ground, forcing the seats to collapse into a storage position.

Dual, or side-by-side strollers, are shown for instance, in U.S. Pat. Nos. 6,752,405 and 7,516,966. Both patents disclose umbrella-type strollers with two seats arranged side-by-side facing the direction of travel of the stroller. Each stroller has a selectively collapsible portion which allows seating for one child in the unfolded portion adjacent to a partially folded portion of the stroller, or seating for two occupants in a fully opened structure. Similarly, each has a fully folded position similar to the longitudinally oriented tandem stroller discussed above, in which the left and right halves fold together in a scissor fashion.

While such seating orientations may be adequate for transporting two children, both the tandem, longitudinal oriented seat configuration and the dual, transverse oriented seats, have drawbacks. Strollers with a front-to-rear configuration have significant length in order to accommodate two seats, one in front of the other. Access to the rear seat in a front-to-rear configuration is typically more restricted, making the rear seating position less convenient for seating a child in, or removing a child from, the stroller. In many cases, the rear seat is only suitable for smaller children. In the side-by-side configuration, the overall width of the stroller is approximately the width of two individual strollers. In many situations, the known double strollers are inconvenient, largely due to their length or width, or both length and width. For example in tight spaces, such as narrow hallways in buildings or residences, retail stores with, for instance, clothing on racks which are close together, mass transit systems, or crowded sidewalks, known double strollers are difficult to maneuver and pose risks to the child or children in the stroller, other people, or the environment in which they are operated.

Similarly, known double strollers, even when folded or collapsed, require a significant amount of storage space. Some full-featured strollers with accessories for increasing the utility of the stroller may require special attention for folding. Some strollers require at least partial removal of stroller components before the stroller can be collapsed, and even then, the folded stroller requires a significant amount of space for storage. Some strollers require the use of two hands in order to fold completely, thereby making it difficult, if not impossible, for one person to fold the stroller while safeguarding and maintaining control over the child previously in the stroller.

Known strollers may have associated accessories to increase the utility of the stroller. Such accessories may include, for example, drink holders, baskets, coolers, securable containers, and pouches made of a mesh or netted material or a solid material designed to increase the carrying capacity and overall utility of the stroller. Such accessories are known to be in addition to the provided seating arrangement. When only one seat is required or desirable, a dual or tandem stroller requires two seats because the seats may be permanently mounted to the frame. In some instances, it may be desirable to remove one child seat and replace that seat with an accessory, or accessories, as indicated in the exemplary list above. Removal of the unneeded seat may provide benefits, such as reduced weight, increased ease of maneuverability, and smaller size, while increasing the utility of the stroller by providing larger add-on accessories. Known strollers do not provide this flexibility and require the accessories to be used along with both seats, decreasing the size and variety of accessories possible.

Accordingly, the need exists for a two seat stroller configured to overcome at least the previously presented drawbacks of the known dual or tandem strollers.

While certain documents have been cited as examples of strollers configured for two occupants, citation or identification of any document in this application is not an admission that such document is available as prior art to the present invention.

SUMMARY OF THE INVENTION

It can be seen from the foregoing that a need exists for a stroller capable of carrying one or more occupants which is compact in size and allows ease of maneuverability in tight or crowded spaces. The need also exists for a full featured stroller with useful accessories for the occupant and the operator. There is also a need for a stroller for one child, or more than one child, that can fold to a compact size for storage without disassembly or removal of components or accessories. A need also exists for a stroller in which the folding may be achieved by one operator or user with the use of only one hand.

It has been found through research and development that an alternative structural arrangement for double seat strollers has been achieved, that is to reconfigure the seating arrangement of a double seat stroller to fit within a the dimensional footprint of a conventional single seat stroller, resulting in a stroller which is much more amenable for use in an urban environment where more restricted space conditions are encountered (e.g. such as aisle ways in public transportation systems, buildings and in congested walkways and passageways).

The reconfigured designs described and claimed herein provide for multiple seating positions for at least one infant or child, that is principally to arrange each of the seats in a transverse configuration relative to the direction of travel of the stroller, which yields several unexpected advantages regarding the overall structural footprint and functional features thereof. In a preferred embodiment of the invention, such transverse configuration of a double seat stroller yields an overall dimensional area no larger than a conventional single seat stroller. The reduced size for a double seat stroller configuration eliminates the several disadvantages, as detailed above, encountered with conventional front-to-rear (tandem) or side-by-side forward facing (dual) type double strollers.

Based on the inventor's research, representative full-size double strollers currently on the market have overall dimensions, when fully opened and in condition for use, according to Table 1:

Full-Size Double Strollers

TABLE 1

Full-Size Double Stroller Dimensions

| Brand | Model | Width (W) inches | Length (L) inches | Footprint (sq. in.) |
|---|---|---|---|---|
| Dual-type | | | | |
| Baby Jogger | City Mini Double | 29.75 | 38.50 | 1145.38 |
| Baby Jogger | City Micro Double | 29.75 | 36.00 | 1071.00 |
| Baby Jogger | City Double | 29.75 | 47.00 | 1398.25 |
| BumbleRide | Indie Twin 2009 | 29.50 | 36.00 | 1062.00 |
| Easy Walker | Duo | 29.80 | 43.00 | 1281.40 |
| Graco | Twin IPO | 30.80 | 26.50 | 816.20 |
| Jeep | Wrangler Twin | 32.00 | 30.00 | 960.00 |
| Maclaren | Twin Triumph 2010 | 34.50 | 29.00 | 1000.50 |
| Maclaren | Twin Techno 2010 | 31.00 | 29.25 | 906.75 |
| Peg Perego | Aria Twin 60/40 2009 | 39.75 | 25.75 | 1023.56 |
| Tandem-type | | | | |
| Contours | Tandem | 25.50 | 52.00 | 1326.00 |
| Graco | Quattro Tour Duo | 22.30 | 39.00 | 869.70 |
| Graco | Duo Glider LX | 20.00 | 35.50 | 710.00 |
| Joovy | Caboose | 21.50 | 34.00 | 731.00 |
| Joovy | Big Caboose | 21.50 | 55.00 | 1182.50 |
| Peg Perego | Duette SW 2009 | 23.00 | 42.00 | 966.00 |
| Phil & Ted | Sport Buggy | 24.00 | 30.00 | 720.00 |

Similarly, the inventor has discovered through research that representative standard-size single strollers have general overall dimensions, when fully opened and in condition for use, according to Table 2:

Standard-Size Single Strollers

TABLE 2

Standard-Size Single Stroller Dimensions

| Brand | Model | Width (W) inches | Length (L) inches | Footprint (sq. in.) |
|---|---|---|---|---|
| Baby Jogger | City Mini | 24.00 | 39.00 | 936.00 |
| Baby Jogger | City Micro | 23.50 | 37.50 | 881.25 |
| Britax | Chaparone | 22.50 | 34.25 | 770.63 |
| Bugaboo | Frog | 23.65 | 37.40 | 884.51 |

TABLE 2-continued

Standard-Size Single Stroller Dimensions

| Brand | Model | Width (W) inches | Length (L) inches | Footprint (sq. in.) |
|---|---|---|---|---|
| Chicco | Trevi | 18.30 | 33.50 | 613.05 |
| Graco | Quattro Tour Sport | 24.00 | 30.00 | 720.00 |
| Graco | Alano Flip It | 19.50 | 27.00 | 526.50 |
| Graco | Mosaic | 20.00 | 26.50 | 530.00 |
| Graco | IPO | 19.00 | 26.50 | 503.50 |
| Graco | Metro Lite | 19.00 | 28.00 | 532.00 |
| Inglesina | Trip | 19.00 | 30.00 | 570.00 |
| Inglesina | Zippy | 20.00 | 35.00 | 700.00 |
| Inglesina | Swift | 19.00 | 30.00 | 570.00 |
| Maclaren | Triumph 2010 | 19.00 | 31.50 | 598.50 |
| Maclaren | Grand Tour | 19.00 | 41.00 | 779.00 |
| Maclaren | Techno XT | 20.00 | 31.00 | 620.00 |
| Maclaren | Techno XT | 20.00 | 31.00 | 620.00 |
| Maclaren | Volo | 19.00 | 33.00 | 627.00 |
| Peg Perego | Aria | 19.50 | 33.50 | 653.25 |
| Peg Perego | Skate | 23.50 | 32.00 | 752.00 |
| Peg Perego | Pliko P3 | 21.00 | 35.25 | 740.25 |
| Peg Perego | Uno | 23.17 | 35.00 | 810.95 |
| Stokke | Xplory | 22.80 | 36.50 | 832.20 |

The inventor has also discovered through research that representative light weight and ultra-compact single strollers have general overall dimensions, when fully opened and in condition for use, according to Table 3:

Light Weight and Ultra Compact Single Strollers

TABLE 3

Light Weight and Ultra-Compact Single Strollers

| Brand | Model | Width (W) inches | Length (L) inches | Footprint (sq. in.) |
|---|---|---|---|---|
| Aprica | Stick Flat | 18.7 | 31.0 | 579.7 |
| Aprica | Cookie | 21.3 | 35.8 | 762.5 |
| Bumbleride | Flite | 19.0 | 35.0 | 665.0 |
| Chicco | Liteway | 19.0 | 36.0 | 684.0 |
| Combi | Super Light | 18.1 | 32.3 | 584.6 |
| Combi | Ultralight | 18.1 | 28.0 | 506.8 |
| Combi | Espresso | 18.7 | 28.7 | 536.7 |
| Combi | Carpatto | 20.5 | 28.5 | 584.3 |
| Concord | Neo | 24.0 | 33.0 | 792.0 |
| Cosco | Umbrella | 13.0 | 25.0 | 325.0 |
| Cybex | Callisto | 21.0 | 33.0 | 693.0 |
| Cybex | Ruby | 19.0 | 32.0 | 608.0 |
| Graco | Mosaic | 20.0 | 26.5 | 530.0 |
| Graco | IPO | 19.0 | 26.5 | 503.5 |
| Graco | Metro Lite | 19.0 | 28.0 | 532.0 |
| Inglesina | Swift | 19.0 | 30.0 | 570.0 |
| Joovy | Kooper | 21.0 | 31.5 | 661.5 |
| Maclaren | Volo | 19.0 | 33.0 | 627.0 |
| Mamas & Papas | Nipi | 18.5 | 33.5 | 619.8 |
| Mamas & Papas | Luna | 24.0 | 36.0 | 864.0 |
| Mia Moda | Cielo | 17.3 | 40.0 | 692.0 |
| Micralite | Toro | 24.0 | 35.0 | 840.0 |
| Obaby | Atlas | 15.0 | 24.4 | 366.0 |
| Quicksmart | Backpack | 22.0 | 24.0 | 528.0 |
| Quinny | Zap | 23.5 | 25.5 | 599.3 |
| Valco Baby | Latitude | 22.5 | 33.0 | 742.5 |

As indicated in the data of Tables 1, 2 and 3, the double strollers are generally larger than the standard-size single strollers, and significantly larger than most of the light weight and ultra compact strollers currently on the market, particularly in the total area (L×W) occupied by the stroller. This is typically referred to as the "footprint" of the stroller and gives a general overview of the surface space taken up by the stroller. While the length and width, as measured in the longitudinal and transverse directions, respectively, may be of interest, in many instances, it is the footprint, the mathematical product of length and width, that is more indicative of the overall size of the stroller.

According to embodiments of the present stroller in which the seating position of two seats is arranged such that each seat is facing transverse to the direction of travel of the stroller, a significant decrease in length and width, and therefore a decrease in the footprint of the stroller is achieved. In at least three embodiments of a double stroller according the present invention, the dimensions and the footprint of the double stroller are substantially smaller than current double strollers.

The first embodiment is representative of an umbrella-type double stroller with seats facing transverse to the direction of stroller travel made in accordance with this disclosure. The second and third embodiments represent other embodiments of double strollers with transverse facing seats made in accordance with this disclosure.

The dimensions of three embodiments of a double stroller in accordance with the present invention are presented in Table 4.

TABLE 4

Double Stroller Dimensions According to Embodiments of the Present Invention

| Embodiment | Width (W) inches | Length (L) inches | Footprint (sq. in.) |
|---|---|---|---|
| First Embodiment | 16.0 | 16.0 | 256.0 |
| Second Embodiment | 23.2 | 28.3 | 654.6 |
| Third Embodiment | 24.3 | 29.6 | 718.8 |

In comparing the dimensions of length and width of the present invention as shown in Table 4 with the length and width dimensions of the known full-size double strollers of Table 1, the stroller according to the present invention is significantly smaller than all presently known double strollers. Furthermore, in comparing the dimensions of length and width of the inventive double stroller as shown in Table 4 with the length and width of the known standard single strollers of Table 2, the present stroller is no larger than some known standard single strollers, and in many cases is smaller than the known single strollers. Similarly, the length and width of the inventive double stroller as shown in Table 4 are smaller than many of the light weight and ultra compact single strollers as shown in FIG. 3. The reduced footprint can be achieved without reducing the seating space available for the occupying child over the seating space provided by comparable full-sized single and double strollers. Seating space in some embodiments has not been reduced to achieve the reduced overall stroller size.

According to embodiments of the present invention, a double stroller is provided in which two seats are arranged transverse to the longitudinal axis of the stroller or stroller frame, that is, in a direction perpendicular to the travel direction of the stroller. A benefit obtained from this configuration is, according to a first embodiment, a fully opened double stroller having width and length dimensions of about 16 inches×16 inches. According to a second embodiment, a fully opened double stroller having width and length dimensions of about 23 inches×28 inches may be realized. In a third embodiment, a fully opened double stroller having width and length dimensions of about 24 inches×29 inches may be achieved.

The size benefits illustrated in Tables 1-4 and discussed above may be realized in a stroller in which two seats are directly or indirectly mounted to the stroller, or to the stroller frame, such that a longitudinal axis of the seats is perpendicular to the longitudinal axis, i.e., the seats face transverse to the direction of travel of the stroller, meaning that each of the seats is facing left, or facing right. In a configuration including more than two seats, the seats may be transverse mounted with seats facing in the same or opposite directions.

According to some embodiments of the present invention, an umbrella-like stroller is provided in which two seats are positioned transverse to the direction of travel of the stroller, with both seats facing the same direction. Alternately, one seat may face to the left and one seat may face to the right. In some embodiments, the stroller is configured to uniquely collapse or fold in an umbrella-like fashion in both the longitudinal and transverse directions.

According to embodiments of an umbrella-like stroller, the stroller frame includes a plurality of linear, or curvilinear, frame elements which provide, among other things, support for child seating surfaces and a handle, or handles, for control of the stroller. In some embodiments, sling-type seats are suspended from frame elements to provide foldable seating surfaces.

Frame elements may have first and second end portions, and intermediate portions located between the end portions. Some embodiments include pairs of frame elements arranged for scissor-like pivotal motion about a point located in the intermediate portions of the paired frame elements. Some embodiments include pairs of frame elements arranged such that one end of an element is pivotally connected to a portion of the second frame element in end-to-end fashion. Alternately, one end of a first element may be connected for pivotal motion to an intermediate portion of a second element. The pivot motion allows the frame elements to rotate between at least a first position in which the stroller frame is at least partially open and in condition for use and a second position in which the stroller frame is at least partially closed or collapsed in a non-use condition, as for storage or transport, for example.

In some embodiments, the paired frame elements are arranged such that pivot points are substantially aligned parallel to the longitudinal axis of the stroller frame. In these embodiments, some paired elements may be arranged such that the paired elements form opposing transverse diagonals of the umbrella-type stroller frame. The transverse diagonals may pivot about their common pivot point to fold or collapse the stroller in a transverse direction.

Similarly, some frame element pairs may be arranged such that pivot points are substantially aligned parallel to the transverse axis of the stroller frame. In these embodiments, some paired elements may be arranged such that the paired elements form opposing longitudinal diagonals of the umbrella-type stroller frame. The longitudinal diagonals may pivot about their common pivot point to fold or collapse the stroller in a longitudinal direction.

Embodiments of the umbrella-type folding stroller frame may comprise at least one transverse frame element pair arranged with the pivot axis substantially aligned with the longitudinal axis of the frame and at least one longitudinal frame element pair arranged with the pivot axis substantially aligned parallel to the transverse direction of the frame. The transverse and longitudinal frame pairs may pivot about their respective pivot points to fold or collapse the umbrella-type stroller frame in both the transverse and longitudinal directions.

In other similar embodiments of the invention, the positioning of a transverse mounted seat may be changed from left-facing to right-facing as desired by effecting a rotation of the seat about a substantially vertical axis of the seat. For example, a seat may be positioned so that it faces to the right, and at a later time, its position may be changed so that it faces to the left. A first seat may be positioned independently of the position of a second seat, if a second seat is provided. The positioning of any individual seat may be achieved regardless of the positioning of any other seat so that any seat may face to the right, to the left, or in any intermediate rotational position. Once the seat is in the desired rotational position, a locking mechanism may be employed to secure the seat in that position until such time that it is desired to change the rotational position.

In some embodiments of the present invention having two seats, the seats may be mounted with one seat in front of the other in a tandem configuration. When the seats are arranged in a tandem configuration, the seats may face in the same or in opposite directions, that is, the front seat may face forward, rearward, right, or left, and the rear seat may face in the same or in the opposite direction. Consequently, in some embodiments, the stroller passengers may face in opposite directions, or they may face the same direction. In some embodiments in which two stroller occupants face opposite directions, the seats may be positioned such that the occupants may see each other. In other configurations, the transverse mounted seats may be positioned such that the occupants cannot see each other.

For the purposes of this disclosure, the term "stroller" means a baby or child transport device and is used with the intention of conveying the broadest reasonable interpretation. The term is used to include at least the devices commonly referred to as a "baby carriage," "pram," or "carrycot" for transport of a newborn or infant generally lying flat, as well as "stroller," "pushchair," or "buggy" for the transport of an older child, generally in a sitting position. The sitting position may range from an erect sitting position in which at least portions of the seat and seat back are generally at a right angle to each other, and a fully reclined position in which at least portions of the seat and seat back approach a coplanar configuration.

In some instances in this disclosure, a stroller is intended to mean a wheeled device for transporting at least one child. While it is difficult to place an exact age range for a child to be so transported, it will be understood that the lower limit of the range begins at birth. The upper age limit depends upon the strength, maturity, tractability, attention span, and physical and mental development of the child, among other factors. In some cases, a child of three years of age may be sufficiently developed to no longer require a stroller, while in other cases, a child of six years of age, or more, may still require a stroller under some circumstances.

The upper limit may also be determined by the child's weight, sometimes in combination with the child's height. When considering strollers for more than one child, weight becomes more of a concern for maneuverability of the stroller, safety of the occupants and others, strength required of the operator, and mechanical stresses placed on the structure, among other factors. In some cases, the weight limit for a stroller may be placed at 110 pounds (approximately 50 kg.) for structural concerns, the safety of the child or children, and ease of mobility, among other factors.

For purposes of this disclosure, left, right, front, and rear, and variations thereof, are intended to be taken with respect to the normal forward direction of travel of the stroller. In most cases, a stroller has a handle, or handles, or a similar structure to facilitate movement and control of the stroller by an operator. Handles may be provided for grasping by the operator in order to impart controlled movement to the stroller. Handles typically have a first end connected to the stroller and a second end, opposite the first, adapted for engagement by the operator, usually by gripping or grasping. Because strollers are typically pushed, the handle structure is usually positioned such that the operator-engaging end of the handle is at the trailing end, or rear, of the stroller so that the stroller can be pushed, steered, and controlled.

Characteristically, strollers are provided with a plurality of wheels, rotatably mounted on a generally horizontal axis for rotation with respect to the stroller. Control and movement of the stroller may be enhanced by at least one steerable wheel mounted on a pivot axis substantially perpendicular to the wheels' axis of rotation. The steerable wheel is typically mounted to the stroller at the end opposite the handle, that is, the steerable wheel, or wheels, are typically mounted at the leading end, or front, of the stroller. This is the convention that will be used throughout this disclosure.

Applicant recognizes that the front, or leading end, of the stroller may be transformable to the rear of the stroller by modifying the position of the handle, such as by pivoting the handle about the connection point with the stroller. Regardless of the transformative nature of front and rear, when the stroller is in a configuration for use, the stroller is generally understood and recognized as having a front and a rear. From the apparent front and rear, left and right can be determined.

Further, "seat" is used in the broadest sense of the word which may mean, among other things, a surface on which something sits or rests. As used throughout this specification, the broadest meaning may include, as non-limiting examples, bassinets for newborn infants, infant seats with appropriate seating support structure, cushioning, and restraints for older infants, and child seats with restraints for toddlers. In addition, seats may be removable and mountable in an automobile as a child safety car seat appropriate for the child's size, weight, age, or other determinative factor.

The seat may also be customized for children as may be dictated by medical or physical conditions. As such, the seat may not necessarily resemble a seat normally associated with infants or children and may have features specific for the medical needs of the occupant.

In other embodiments of this invention, the stroller may be convertible from a baby transport device to a utility transport device, such as a cart, by replacing one or more seats with a variety of accessories or appliances to assist an operator in carrying objects from place to place.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

According to some embodiments of the present invention, a stroller is provided which is comprised of a folding frame, including a plurality of wheels, the frame having a longitudinal axis, a transverse axis and a vertical axis, and at least one seat directly or indirectly mounted to the frame. The seat may include a longitudinal axis and a transverse axis, and may be mounted to the frame such that the longitudinal axis of the seat is perpendicular to the longitudinal axis of the folding frame. The seat may be fixed in its rotational position or may be selectably rotatable about the seat's vertical axis.

In accordance with embodiments of this invention, the inventive stroller is provided with a frame comprising a mechanism which allows the stroller to collapse into a compact configuration for storage or transport. The mechanism for collapsing the stroller may be activated with one hand. The process of collapsing the stroller may be accomplished without removal of any component of the double stroller.

In some embodiments of this invention, the frame includes a plurality of legs, a first end of each of the legs may be supported for movement with respect to a substantially vertical central shaft. The support of the first end of the legs may allow rotation of the first end of the legs about an axis generally orthogonal to the axis of the central shaft.

A second end of at least some of the legs may comprise a wheel assembly of one or more wheels mounted for rotation about an axis. In some embodiments, at least one wheel assembly is mounted for pivotal rotation about an axis generally perpendicular to the wheel's axis of rotation.

The legs may be straight, or substantially straight, from the first end to the second end according to some embodiments. In other embodiments, the legs may be curved or arched, with either a constant radius of curvature or one or more varying radii of curvature. In some embodiments, the plurality of legs is arranged symmetrically about the central shaft. That is, the legs are positioned at even, or substantially even, intervals around the shaft. In other embodiments, the legs may be symmetrically arranged about only one axis of the stroller. For instance, in some non-limiting embodiments, the legs may be symmetrical with respect to the longitudinal axis only, or symmetrical with respect to the transverse axis only.

In some embodiments of the invention, the frame comprises a handle or handle-like structure. A first end of the handle may be functionally linked to a portion of the frame, for example, the central shaft. A second end of the handle may be adapted for grasping or gripping by the operator of the stroller for imparting controlled motion to the stroller. The second end may also include a console including storage locations, beverage holders, or other amenities to increase the functionality and usefulness of the stroller for the operator.

The functionally linked first end of the handle may directly or indirectly engage a collapsing mechanism located in or on the central shaft to urge the stroller to collapse into at least a partially folded configuration. In some embodiments, a component, series of components, or a linkage within the handle directly or indirectly engages the collapsing mechanism to urge the stroller into at least a partially folded configuration. A non-limiting, exemplary collapsing mechanism may comprise one or more rigid or flexible links, gears or gear trains, sleeves and actuators, cams, screw forms, levers, or resilient members, alone or in combination. In some embodiments, the seat or seats may collapse or fold to facilitate the stroller folding in to a compact package.

According to some embodiments, in order to collapse the frame and the stroller, the collapsing mechanism may comprise a retracting link functionally attached to one or more of the legs at their second end, or at the wheel assemblies mounted thereto. According to some embodiments, upon activation of the collapsing mechanism, the retracting link urges the legs inwards, towards the central shaft, as the first end of the leg pivots about its axis.

In at least one embodiment, the frame may comprise four legs which may be spaced around the central shaft and oriented similar to an umbrella deployed to provide protection from the sun or rain, that is, the legs are concave down. The legs spaced around the central shaft may have one or more axes of symmetry with respect to the central shaft. In some embodiments, the legs have no axis of symmetry about the central shaft. In a symmetrical configuration, the legs may correspond to the ribs of the umbrella and the retracting links may correspond to the stretchers which deploy and secure the ribs or legs in the open position, or retract the ribs into a collapsed configuration.

In some of the embodiments, the handle, or components within the handle, may assist in the deployment of the stroller from at least a partially folded configuration as well as assist in collapsing, or folding, the umbrella from a fully deployed configuration.

According to some embodiments of the invention, a stroller is provided in which one or more seats may be indirectly or directly mounted to the stroller frame such that a longitudinal axis of the seat or seats is positioned parallel to a longitudinal axis of the stroller. The seat or seats may be side-by-side or in-line, and may face in the direction of travel or opposite the direction of travel. In some embodiments, the orientation of a seat may be changed from front-facing to rear facing, or to any intermediate rotational position as desired by effecting a rotation of the seat about a substantially vertical axis of the seat. Once the seat is in the desired rotational position, a locking mechanism may be employed to secure the seat in the desired position until such time that it is desired to change the rotational position.

In embodiments with more than one seat, the in-line arranged seats may be configured to face the same direction or in opposite directions, either facing each other or facing away from each other.

In some embodiments of the present invention, the seats may be mounted to a seat support structure, and the seat support structure mounted for rotation on the stroller frame about a substantially vertical axis of the stroller frame. The seat support structure may be provided with a locking mechanism to at least temporarily secure the seat support structure in a desired rotational and prevent unintentional rotation from that position.

In some embodiments, the seats mounted on the rotating seat support structure may additionally be individually rotatable on a substantially vertical axis of each seat. In such an embodiment, the stroller could be configured with the seats side-by-side facing forward, side-by-side facing rearward, side-by-side one seat facing forward and one facing rearward, or inline, one behind the other, each facing the same direction (forward or rearward), or opposite directions (one facing forward, the other rearward). In either side-by-side or in-line configuration, that is either in dual or tandem configuration, the individual seats may be positioned in any rotational position with respect to the stroller frame independently of each other.

According to some embodiments of the invention, the seats may be adjustably positioned such that the child may sit upright, or nearly upright, or in adjustable reclined positions. The inclined positions may be achieved by selectively placing the back portion of the seat in an inclined position varying from approximately vertical to approximately horizontal, with intermediate positions selectable within that range.

According to some embodiments of the invention, the seat incline comprises a mechanism that may allow the seat to move along a linear or curvilinear path, with the seat secured in selectable positions along the path. The components of the seat, for instance the seat portion and the seat back portion, may maintain the same relationship with each other, or the relationship may change throughout the path. In some embodiments of the invention, the position of the center of mass of the seat with respect to the stroller is substantially maintained throughout the linear or curvilinear path of the seat as it reclines. In further embodiments, the position of the center of mass of the seat and the child occupant with respect to the stroller is substantially maintained throughout the linear or curvilinear path of the seat as it inclines.

In some embodiments of the present invention, one or more seats used in the stroller may be removed and replaced with accessories or other structures such as infant or child car seats, baskets, unsecured or lockable storage containers, insulated containers such as coolers, or the like useful to increase the utility of the stroller.

According to some embodiments of the invention, the seat configured for use on the collapsing frame comprises a seat bottom and a seat back which may be one piece, that is, the seat back and bottom may be of unitary construction. According to other embodiments, the seat bottom and the seat back may be of unitary construction with a living hinge therebetween to pivotally connect the seat bottom and the seat back. Alternately, the seat bottom and the seat back may be two or more separate parts, with or without a hinge joining them. In some embodiments, the seat back comprises two portions, a head rest portion and a back rest portion, with one portion sized and configured to telescope into the other portion. In one embodiment, the head rest portion telescopes into the back rest portion.

The seat may be configured such that the seat back can fold towards the seat bottom and remain in the folded position. According to some embodiments of the invention, a separately formed stirrup-like footrest is provided that depends from the forward edge of the seat bottom, i.e., the edge furthest away from the seat back. The stirrup-like footrest may be arranged to pivotally engage the forward portion of the seat bottom and functionally linked to the seat back such that folding the seat back towards the seat bottom draws the footrest into a cavity under the seat bottom. Alternately, folding the seat back towards the seat bottom aligns the footrest with the seat bottom and draws the footrest towards the forward edge portion of the seat bottom.

According to some embodiments of the present invention, the seat bottom comprises a child protection bar which wraps around the seated child. In some embodiments, a child safety harness or seat belt (as is known in the art) may be used instead of, or in conjunction with, the child protection bar.

An alternate embodiment of the inventive stroller includes a stroller frame comprising a plurality of elongate elements, or legs, each leg having a first end portion, a second end portion, and an intermediate portion. The legs may be straight, or substantially straight, from the first end to the second end according to some embodiments, or the legs may be curved or arched, with either a constant radius of curvature or one or more varying radii of curvature. The legs may be pivotally attached to each other and supported for selectable scissor-like rotation about the pivot.

A longitudinal axis of the legs, generally running the length of the leg from the first end portion to the second end portion, may be generally parallel with the longitudinal axis of the stroller frame. In certain embodiments, the pivot point may be located between the first and second end portions of the legs, within the intermediate portion, for example, to form a scissor-like arrangement.

In a stroller including a scissor-like arrangement of legs, end portions of two or more legs may form an included angle with the pivot forming the vertex of the leg end portions. The legs may rotate about the pivot between at least a first position and a second position, forming respective first and second included angles. The first and second positions may correspond to an open and a closed position, respectively, for the stroller frame. For example, as the legs rotate about the pivot between a first position and a second position, at least one included angle may decrease until the leg end portions are substantially aligned, or approximately parallel to each other. Further rotation in the same direction would cause the included angle to increase.

As an ordinary skilled artisan would recognize, as the included angle between pivotably attached legs increases or decreases, opposite ends of the legs would separate from each other, or approach each other, respectively. First leg end portions may be adapted to support one or more wheel assemblies according to this disclosure. The wheel assemblies may comprise one or more wheels supported for rotation on a generally horizontal axis. One or more assemblies may be supported to pivot on a generally vertical axis.

Second leg end portions may be configured to selectively and slidably engage a generally elongate and hollow beam. The beam may have one side partially open to accept the second leg end portions and support at least one of the leg end portions in generally linear displacement along the longitudinal axis of the stroller frame. Alternately, structural elements may be present on an outside surface of the beam to support at least one of the leg end portions in linear displacement. Selective locking elements may be provided in or on the beam and/or on at least one of the second leg end portions to provided selectively releasable locking engagement between at least one of the leg end portions and the beam. In some embodiments, one of the second leg end portions is supported such that linear displacement with respect to the beam is prevented or minimized. Some embodiments support a second leg end portion for rotation along an axis of the second leg end portion.

In some embodiments, one or more child seats are adapted for mounting to the beam as disclosed above. The mounting of the seat or seats may be similar to the mounting method disclosed elsewhere in this specification. That is, the seats may have a longitudinal axis, and the seats may be mounted on the beam such that the longitudinal axis of the seat is perpendicular to the longitudinal axis of the stroller frame. The orientation of the longitudinal axis of the seat may be fixed, or the positioning of the seat may be selectable such that the longitudinal axis of the seat may form substantially any angle with the axes of the stroller frame. In embodiments having more than one seat, the rotational position of the seats may be selected independently of the rotational position of the other seat or seats. According to some embodiments, the seat may rotate about a vertical axis such that the longitudinal axis of the seat is variable.

Seats mounted to the beam as described above may recline as described elsewhere in the specification such that the center of mass of the seat remains essentially in line with the vertical axis of the seat. In some embodiments, the center of mass of the seat and a child occupant remains essentially in line with the vertical axis of the seat.

An alternate embodiment of the invention includes a frame comprising a generally horizontal lower tube substantially aligned with the longitudinal axis of the stroller frame. Assembled to the lower tube may be a first end portion of each of a plurality of generally elongate support tubes or tube-like elements which extend from the lower tube. One or more of the first end portions of the support tubes may be adapted for rotation about the lower tube. The term "tubes" is used for convenience in this specification and is intended to include hollow or solid structures of any suitable cross section. For instance, in a non-limiting example, the cross section of the tubes may be circular, oval, or rectangular.

A second end portion of the support tubes may be located distally from the lower tube, generally above the lower tube and forming an angle with vertical. In some embodiments, the support tubes form an acute angle with vertical.

An intermediate support tube portion lies between the first end and second end portions of the support tubes. The support tubes may be generally straight, curvilinear, or a combination of straight and curvilinear. According to some embodiments, intermediate portions of adjacent support tubes may be pivotably connected for rotation about an axis generally parallel to an axis of the lower tube and the longitudinal axis of the stroller frame. As such, at least some of the support tubes can be attached for pivotal rotation about an intermediate portion of the support tube in a scissor-like fashion.

In some embodiments, a plurality of wheel assemblies, as disclosed elsewhere in this specification, may be supported on first end portions of wheel support tubes. The wheel assemblies may comprise one or more wheels supported for rotation about a generally horizontal axis. One or more wheel assemblies may be supported for rotation about a generally vertical pivot axis.

The wheel support tubes may be generally straight, curvilinear, or a combination of straight and curvilinear, and may comprise a second end portion and an intermediate portion. According to some embodiments of the invention, wheel support tubes may be attached, directly or indirectly, at one or more points along their length to support tubes, wheel support tubes, or the lower tube. Some attachments may support rotation of one tube about the other and may provide a pivot axis generally parallel to the longitudinal axis of the stroller.

In some embodiments, the second end of at least some of the wheel support tubes and the second end of at least some of the support tubes may cooperate to provide mounting points for one of more seats to be mounted to the stroller frame. According to some embodiments, second end portions of consecutive wheel support tubes may be linked by a rigid or semi-rigid structure to provide a first mounting surface for a seat. According to some embodiments, second end portions of consecutive support tubes may be linked by a rigid or semi-rigid structure to provide a second mounting surface for a seat.

In some embodiments, a seat may be mounted such that the longitudinal axis of the seat is perpendicular to the longitudinal axis of the stroller frame. The seat position may be fixed or the seat may be supported for rotation about a generally vertical axis of the seat such that the seat longitudinal axis may be selectively positioned to form essentially any angle with the axes of the frame. In embodiments comprising more than one seat, the rotational position of the seats may be varied independently of the position of the other seat or seats.

In some embodiments, the seat or seats may be mounted to recline as disclosed elsewhere in this specification. According to some embodiments, the seat may be mounted to recline such that the center of mass of the seat remains essentially aligned with the vertical axis of the seat. According to some embodiments, the seat is supported to recline such that the center of mass of the seat and the child occupant remains aligned essentially with the vertical axis of the seat.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings, in which:

FIG. 15(*b*) is a perspective view of a stroller according to an embodiment of this invention with an alternate seating arrangement;

DETAILED DESCRIPTION OF EMBODIMENTS OF THE INVENTION

Embodiments of the invention are described below with reference to the accompanying drawings which depict embodiments of a two-seat stroller. However, the invention is not limited to the depicted embodiments and the details thereof, which are provided for purposes of illustration and not limitation.

Figure 1:
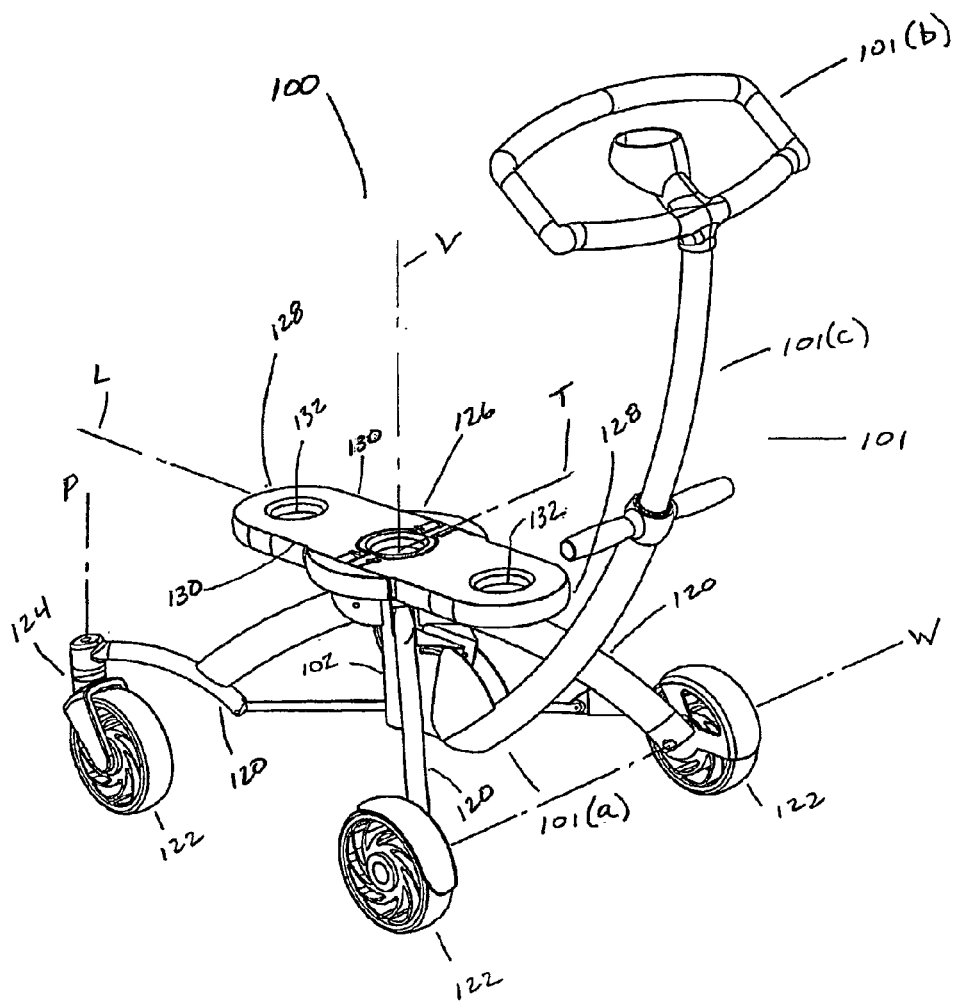
FIG. 1 is a perspective view of a stroller frame fully deployed according to one embodiment of the present invention.

FIG. 1 illustrates an exemplary, non-limiting frame 100 for a stroller according to an embodiment of the present invention. As shown, the frame 100 has a longitudinal axis L and a transverse axis T. The longitudinal axis L is aligned with the front-to-rear direction of the stroller frame 100, and the transverse axis T is aligned with the left-to-right direction. Handle 101 is attached to the frame 100 at the rear of the stroller 100. The front of the stroller is opposite the point of attachment of the handle 101.

The frame comprises a central shaft 102 having a substantially vertical axis V. For ease of illustration only, the central shaft is illustrated as having a round cross section although central shafts having other cross sectional shapes may be appropriate and obvious to one of ordinary skill in the art.

Figure 2:
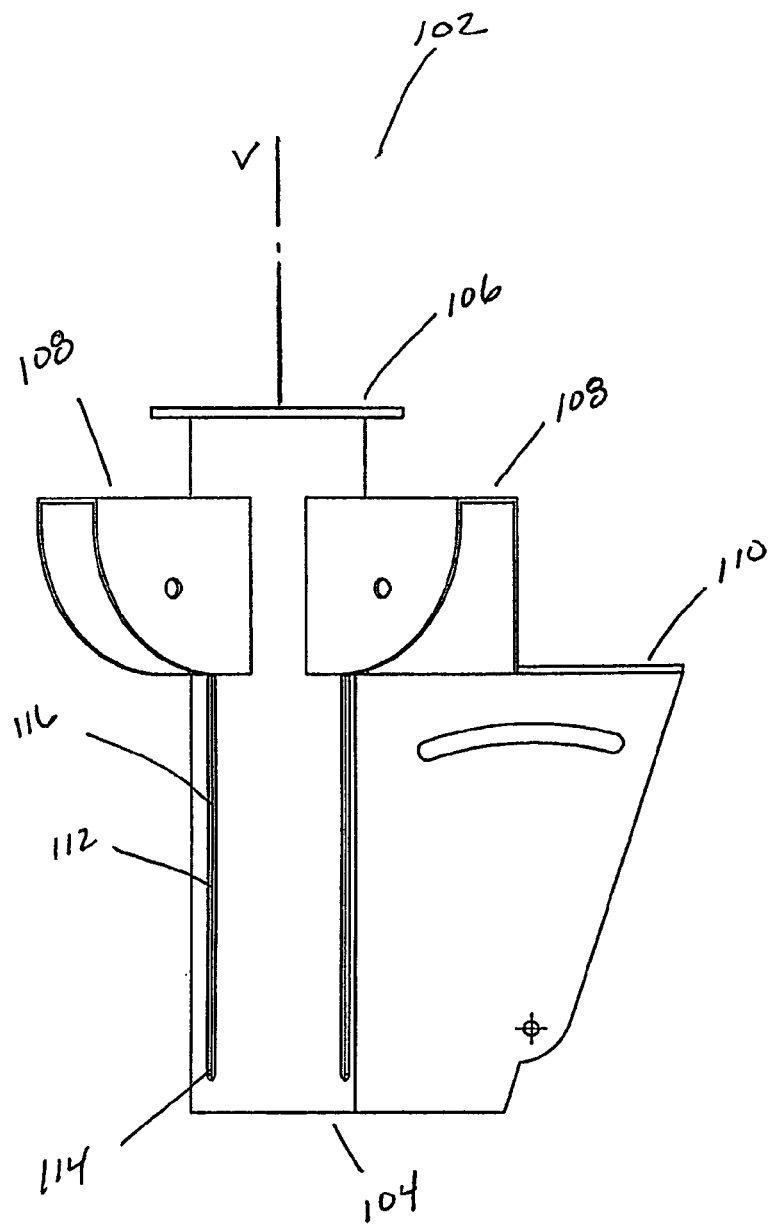
FIG. 2 is a side view of a central shaft according to one embodiment of the present invention.

According to an embodiment of the present invention, the central shaft 102 has an upper end portion 106 spaced a distance from a lower end portion 104 as illustrated in FIG. 2. At the upper end portion 106, the central shaft may have a plurality of leg flanges 108 formed or attached thereto. In some embodiments of the present invention, the leg flanges 108 are arranged symmetrically around the axis of the central shaft V as illustrated. In other embodiments, the leg flanges 108 may be symmetrical with respect to the longitudinal axis, the transverse axis, or both the longitudinal and transverse axes of the stroller frame.

One or more handle mounting flanges 110 may be formed or attached to the central shaft 102 at the lower end 104. The handle mounting flanges 110 may be mounted to the central shaft 102 at the portion of the central shaft 102 that will be facing rearwards when the stroller frame is used in a normal manner. In some embodiments, two handle mounting flanges 110 are provided offset a fixed distance from each other, parallel to each other and parallel to the V axis of the central shaft.

According to embodiments of the present invention, the central shaft 102 is a least partially hollow, forming a cavity 112 within the central shaft 102. Within this cavity 112 may be a mechanism 114 for collapsing components of the stroller to be described more fully below. The central shaft may also include openings in the wall of the shaft 102 between the cavity 112 and the exterior. As shown, the openings may be elongated slots 116 extending from the lower end portion 104 towards the upper end portion 106. According to some embodiments, the elongated slot openings 116 do not extend to the ends of central shaft 102.

In an alternative embodiment, the collapsing mechanism 114 may be mounted to the outside of the central shaft.

Figure 3:
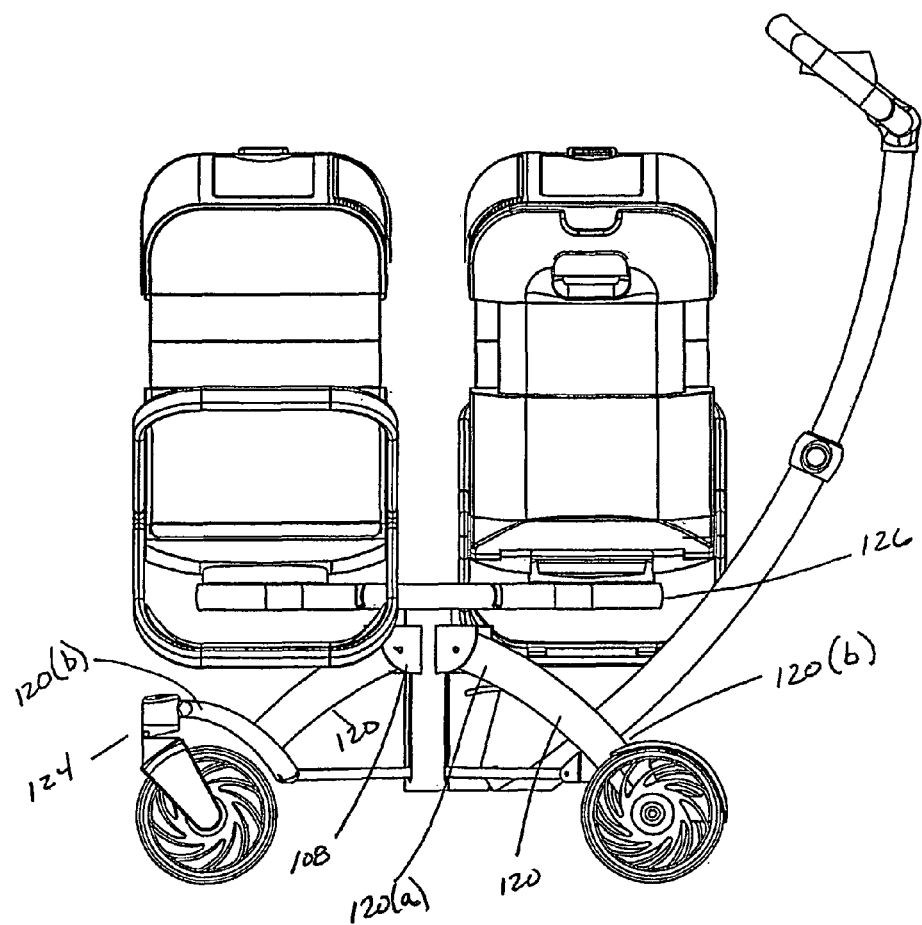
FIG. 3 is a side view of a stroller according to one embodiment of the present invention.

The frame according to embodiments of the present invention comprises a plurality of generally elongate legs 120, each having a first end 120(a) and a second end 120(b), as shown in FIG. 3. Legs 120 may be linear or curvilinear, and may have one or more radii of curvature along their length. The plurality of legs 120 may all have the same linear or curvilinear shape, or may have different shapes. According to one embodiment as shown in the figures, the legs 120 may be arranged in similarly shaped pairs, for example a front pair and a rear pair.

First end 120(a) of the legs 120 may be pivotably attached to the leg flanges 108 for rotation about an axis generally orthogonal to the vertical axis V of the central shaft 102 according to embodiments of the present invention. Thus, the plurality of legs 120 may rotate about first end 120(a) in planes substantially aligned with the vertical axis V of the central shaft 102. In other embodiments, the legs 120 may rotate about first end 120(a) in planes skewed from the vertical axis V.

Because the legs 120 are affixed to the central shaft at leg flanges 108, the degree of symmetry the legs have with respect to the central shaft is dependent on the arrangement of the leg flanges 108. The legs 120 may be evenly spaced about the perimeter of the central shaft 102, or the spacing may vary according to a pattern as required by the design. Accordingly, the legs may have one or two axes of symmetry with respect to the longitudinal and transverse axes of the stroller frame 100. For example, the legs may be symmetrically arranged with respect to the longitudinal axis only, the transverse axis only, or both the longitudinal and transverse axes. In some embodiments, the legs may have no axis of symmetry with respect to either the longitudinal and transverse axes of the frame 100.

The second end 120(b) of legs 120 may comprise wheel assemblies 122 of one or more wheels mounted thereto and supported for rotation about a generally horizontal axes W. According to some embodiments of the present invention, one or more wheel assemblies 122 may be supported at a second end 102(b) of a leg 120 with a pivoting mount 124 configured to provide pivotal rotation about an axis P which may be perpendicular to the axis of rotation provided for the wheels. Wheels mounted with a pivoting mount 124 to second end 102(b) of a leg 120 may therefore rotate about wheel axis W and the wheel assembly may pivot about pivot axis P.

Some embodiments of the present invention include an elongate handle 101 secured at one end to the stroller frame 100 and a second end is configured for grasping or gripping by a user or operator. Handle 101 may comprise a plurality of sections or portions, for example 101(a), 101(b) and 101(c) as shown in FIG. 1.

According to embodiments of the invention, a first end portion 101(a) of handle 101 is operatively connected to handle mounting flange 110 and is configured to functionally link, either directly or indirectly, with the collapsing mechanism 114. According to some embodiments of the present invention, the handle first end portion 101(a) is pivotally mounted to the central shaft 102 between two generally parallel handle mounting flanges 110. The handle mounting flanges 110 may be mirror images of each other and provide aligned pivot point supports 118, shown as concentric holes. One method of mounting the handle to the handle mounting flanges 110 includes providing a pivot pin or similar element that passes through a first pivot point support 118 in one flange, through a similarly sizes passage (not shown) in the handle 101 and through the pivot point support 118 in the second flange.

According to some embodiments, the collapsing mechanism 114 also provides assistance in deploying the stroller from a folded position to an open position for use.

A second end portion 101(b) of handle 101 is configured to be gripped or grasped by an operator or user to impart controlled motion to the stroller frame. Second end portion 101(b) may be configured in any shape that lends itself to convenient and comfortable manual engagement for control of the stroller frame 100. Exemplary, non-limiting configurations may include a T-shaped engagement portion as shown in FIG. 1, a D-shape portion, a circular or ovular portion, or any other suitable shape or configuration that allows sufficient comfort and control. Two engagement portions may be provided, one for each hand, or one engagement portion may be provided for both hands, as is known to the art. The engagement portion may include a console for retaining personal items, such as beverages, keys, cellular phones or other personal electronics, or other personal items in secured or unsecured compartments.

An additional section or sections 101(c) may be disposed between section 101(a) and 101(b) as show in FIG. 1. For clarity, only one section 101(c) is shown. According to some embodiments, handle 101 may be adjustable in length under certain conditions. For example, section 101(c) may be configured to retract into section 101(a) or extend from section 101(a) as desired. As non-limiting examples, section 101(c) may retract into section 101(a) for storage or extend from section 101(a) to provide an adequate length handle for operator comfort.

In some embodiments of the present invention, the stroller frame comprises a seat support structure 126 mounted to the central shaft 102 of the stroller frame 100. In some embodiments, the seat support structure 126 may be fixedly mounted to the stroller frame 100 aligned with either the longitudinal axis L (as shown in FIG. 1) or aligned with the transverse axis T (as shown in FIG. 4).

According to other embodiments, the seat support structure 126 may be mounted to the stroller frame 100 to allow for selective rotation of the seat support structure 126 about the vertical axis V of the central shaft 102. Selective rotation may include rotation selectable by an operator or user in degree of rotation about an axis as well as selectable in freedom to rotate about an axis. A locking device (not shown) to selectively prevent or allow rotation may be provided.

FIG. 1 illustrates the stroller frame 100 with the seat support structure aligned with the longitudinal axis L of the stroller frame 100. FIG. 4 illustrates the seat support structure 126 aligned with the transverse axis T of the stroller frame. Intermediate rotational positions about axis V may also be selected for positioning the seat support structure. In some embodiments of the present invention, a releasable locking device (not shown) is provided to at least temporarily secure the seat support structure 126 in the selected rotational position about axis V. The releasable locking device is adapted to release upon activation by a user to reposition, and re-secure against further rotation if desired, the seat support structure 126 at substantially any rotational position about axis V.

Figure 4:
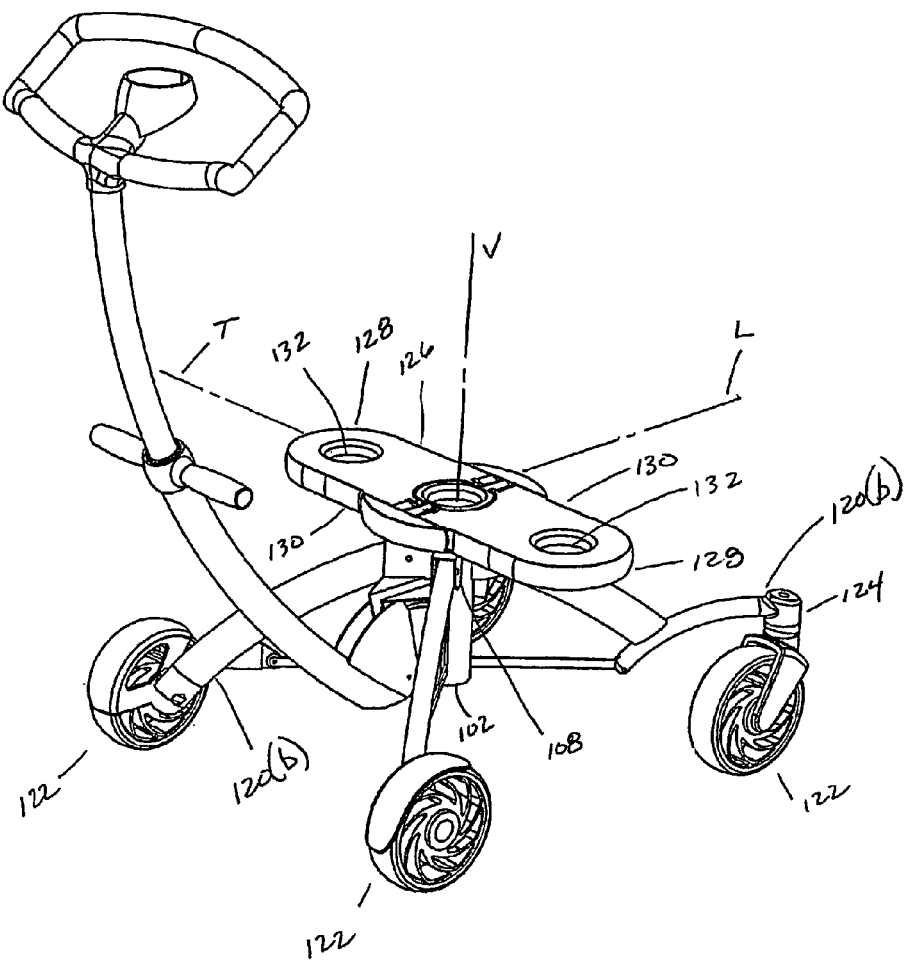
FIG. 4 is a perspective view of a stroller frame according to one embodiment of the present invention with the seat support structure aligned with the transverse axis of the stroller frame.

As illustrated in FIGS. 1 and 4, an exemplary, non-limiting example of a seat support structure 126 may be a structure comprised of two semicircular end segments 128 connected by straight, parallel sides 130 (forming an oblique straight oval), having any suitable cross sectional shape. For ease of illustration only, this general shape as shown in FIG. 1 is carried through in each of the figures illustrating the seat support structure 126. An ordinarily skilled artisan will recognize that structures in many shapes will be suitable for this component. In non-limiting examples, the seat support structure 126 may be oval, round, rectangular, triangular, or free-formed.

As illustrated in at least FIGS. 1 and 4, seat support structure 126 may have spaces 132 toward the semicircular ends 128. The spaces 132 may be at least partially enclosed by a portion of the seat support structure 126. Spaces 132 may be through-holes, extending through the thickness of the seat support structure 126, or the spaces may only extent part way through the seat support structure. Each space 132 may be configured to accept a seat connector of one of the seats as more fully described below.

According to some embodiments of the invention, seat support structure 126 may comprise hinges or pivots 127 (FIG. 19) located on each of the parallel sides 130. The pivots 127 may be aligned in pairs such that adjacent straight parallel sides 130 may pivot such that a portion of the longitudinal axis L of seat support structure 126 becomes parallel to axis V as shown, for example, in FIG. 19. In other embodiments, the pivots may be aligned in pairs such that adjacent straight parallel sides 130 may pivot about the pivot points such that the longitudinal axis L of seat support structure 126 is not parallel to axis V. Pivots aligned in pairs have a substantially common pivot axis such that each pivot of the pair may operate as intended with little or no binding.

Figure 5:
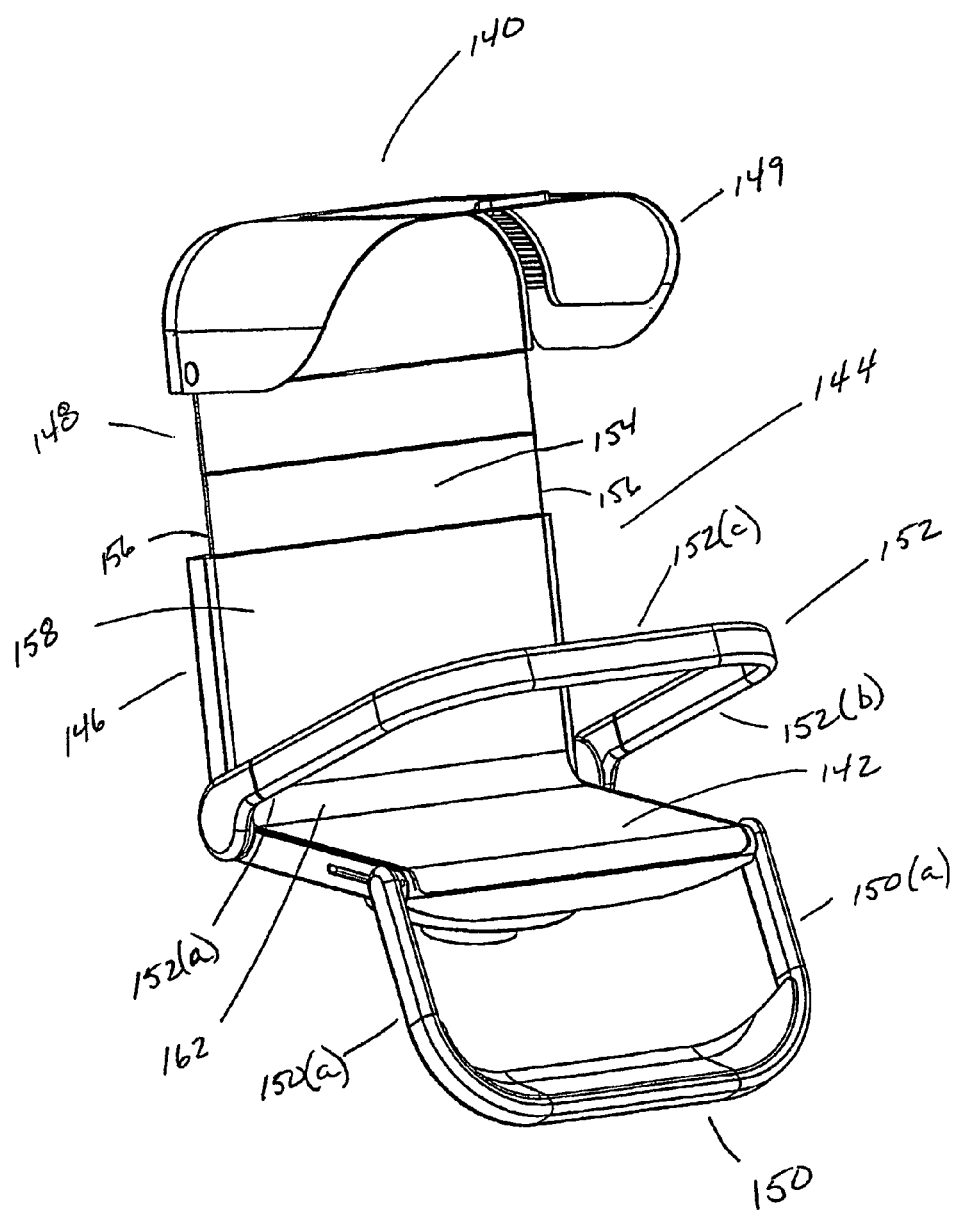
FIG. 5 is a perspective view of a fully opened seat in accordance with an embodiment of the invention.
Figure 6:
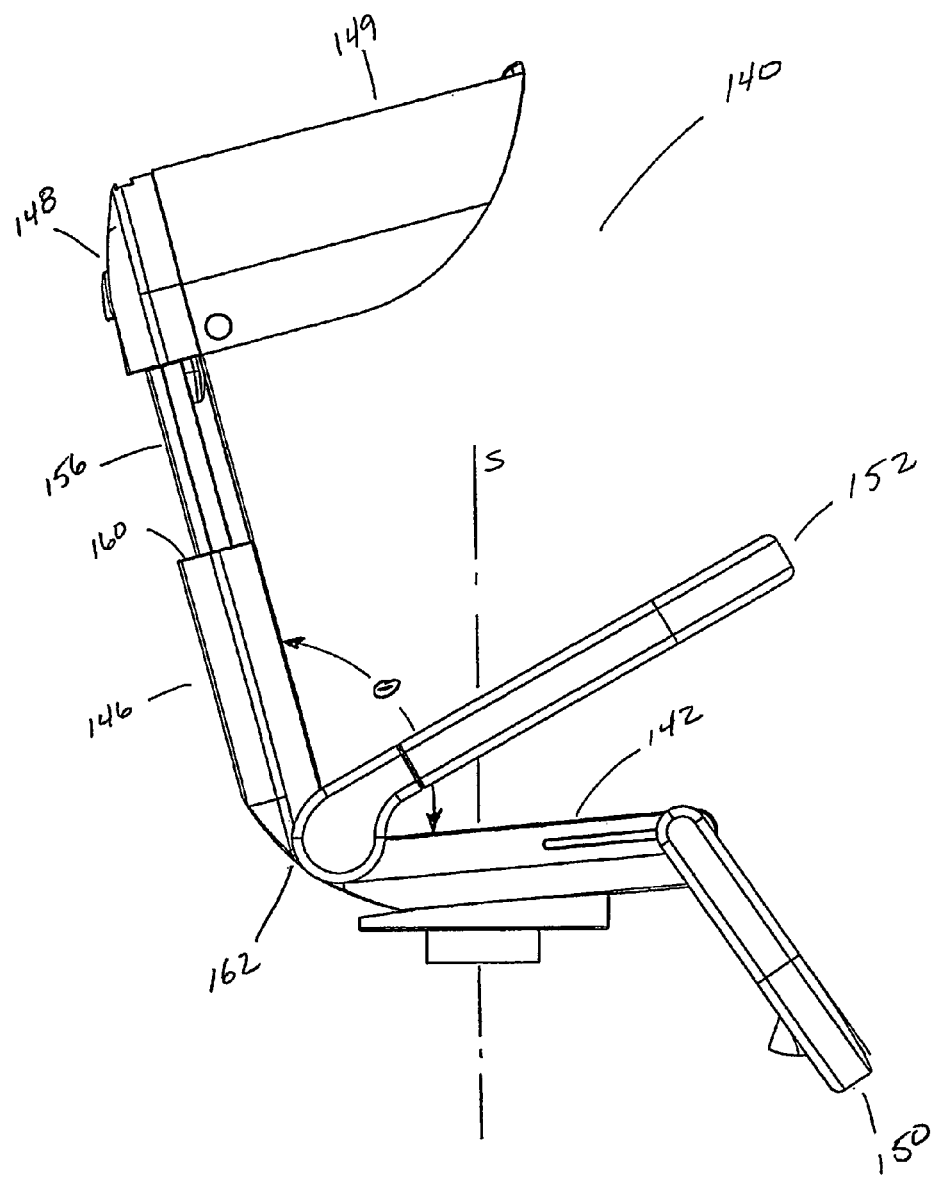
FIG. 6 is a side view of the seat of FIG. 5.

According to various embodiments, the invention may comprise one or more seats 140, generally illustrated in FIGS. 5 and 6, which serves as a non-limiting example of a seat according to this invention. Seat 140 may comprise a seat bottom 142, a seat back 144, a removable or retractable canopy 149, one or more footrests 150, and a safety belt or bar 152. In some embodiments, the seat back 144 comprises backrest 146 and headrest 148. According to some embodiments of the seat 140, headrest 148 may extend from or retract into backrest 146. As shown in FIGS. 5 and 6, headrest 148 comprises central portion 154 and tab portions 156 according to embodiments of the present invention. Backrest 146 comprises a center portion 158 sized and configured to accept central portion 154 of the headrest in sliding engagement. Tab portions 156 are sized and configured to be accepted into backrest slots 160 in a sliding engagement as shown in FIG. 6. Backrest slots 160 and headrest tabs 156 are shown in FIG. 6 on one side of the seat 140. The other side may comprise slots and tabs in a similar configuration adapted for a sliding engagement.

Figure 7:
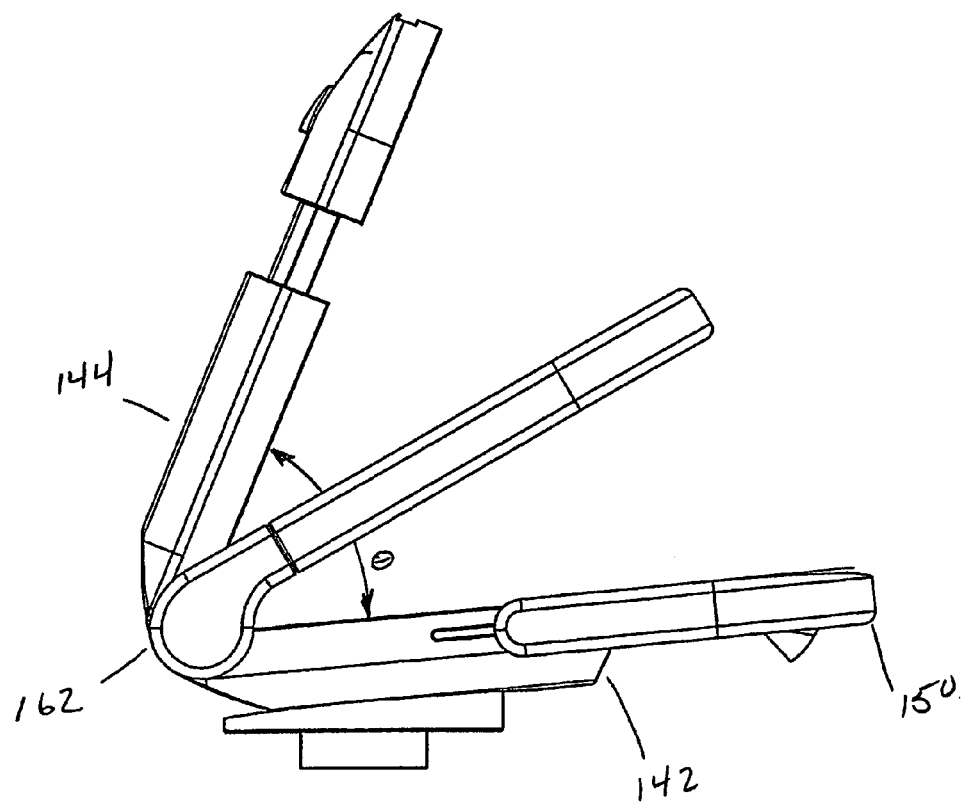
FIG. 7 illustrates the seat of FIG. 6 in a partially folded configuration.

Safety belt or bar 152 may be a rigid, semi-rigid or flexible belt or bar as shown, for example, in FIGS. 5-7 according to this disclosure. For ease of illustration only, safety bar 152 is shown as a rigid or semi-rigid structure formed of three generally linear sides 152(a), 152(b) and 152(c) joined to form three sides of a generally rectangular structure with sides 152(a) and 152(b) forming generally parallel opposite sides and side 152(c) connected to one end of each of parallel sides. The other end of each of the parallel sides is mounted for controlled, limited rotation to a portion of the seat 140. As shown in FIGS. 5-7, sides 152(a) and 152(b) are rotatably attached to a connection point between seat bottom 142 and seat back 144, although one of skill in the art will recognize other mounting locations may be appropriate. One of ordinary skill in the art would also recognize that the shape of safety bar 152 may be other than rectangular. Safety bar 152 may be, in non-limiting examples, semicircular, ovular, elliptical, or may assume any other shape such that, when combined with the seat 140 forms an enclosed space generally defined by the three sides and at least part of the seat 140.

The seat 140 may comprise a separate seat bottom 142 and a seat back 144, or the components may be fabricated as one piece with a molded hinge (or living hinge) connecting the seat bottom 142 and the seat back 144 according to embodiments in this disclosure. In some embodiments in which the seat 140 components are separate elements, the seat bottom 142 and the seat back 144 may be connected at a pivot point or hinge 162 as known in the art. The hinge 162 may be a part separate from both the seat bottom 142 and the seat back 144, and fastened to the seat bottom 142 and the seat back 144 by any means known to the art according to some embodiments of the invention. Alternately, structures may be formed on the seat bottom 142 and the seat back 144 and when assembled together, with or without additional components, form a hinge. In a non-limiting example, the edges of the seat bottom 142 and seat back 144 to be pivotably engaged are formed with cooperating structures configured to mate with each other. In some embodiments, a passage may be provided in each structure such that, when the components are properly placed, the passages align to accept a pin or similar element through each structure, providing an axis of rotation. Alternately, the edge of one part of the seat to be engaged, for example the seat bottom 142, is provided with a first profile configured to be accepted into a second profile provided on the other part, for example the seat back. The first profile is configured for controlled rotation within the second profile. The resistance to rotation may be controlled, for example, by friction between the profiles, by bumps on one profile and detents on the other profile, by a ratchet mechanism, by releasable locking devices, by threaded components, or other structures or techniques known to the art.

The hinge 162 allows the seat back 144 to assume various angular positions with respect to the seat bottom 142. FIG. 6 represents a non-limiting exemplary illustration of a seat 140 according to one embodiment of the present invention in an opened position. As illustrated, the seat back 144, comprising back rest 146 and head rest 148, forms seat back angle θ with seat bottom 142. As illustrated in FIG. 7, the seat back 144 may be selectively rotated by an operator about hinge 162 to either increase θ by rotating the seat back 144 counterclockwise, or decrease θ by rotating seat back 144 clockwise, as desired. Once placed in the desired rotational position, a lock mechanism, not shown, may secure the seat back 144 from further rotation.

Figure 8:
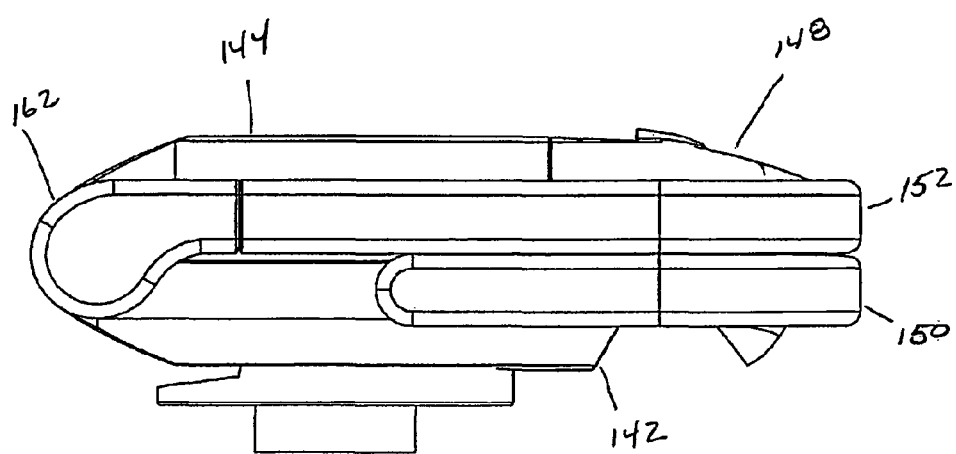
FIG. 8 is the seat of FIG. 6 in a fully folded configuration.

According to some embodiments, seat back angle θ may range from substantially 180° to substantially 0°, that is, from fully reclined to fully folded, respectively. The fully folded position is illustrated in FIG. 8. To achieve a fully folded position according to some embodiments, head rest 148 may be at least partially retracted into back rest 146, thereby decreasing the length of seat back 144. According to some embodiments, the retracted head rest 148 facilitates placement of the seat back 144 within the enclosed space of safety bar 152.

One or more footrests 150 are positioned to slidably and rotatably depend from the front edge portion of the seat bottom 142 according to some embodiments of the present invention, the front edge portion being the edge opposite the hinge, or furthest away from the seat back 144. Footrest 150 may have a perimeter edge 150(*a*) at least partially defining a support structure configured to accept a child's foot placed heel first into the structure. Footrest 150 may be generally hollow, U-shaped structure as shown in FIGS. 5 and 6. In some embodiments, the footrest, or footrests, 150 are functionally linked, directly or indirectly, to the seat back 140 such that when the seat back angle θ decreases, as when the seat back 144 is folded to approach the seat bottom 142, the footrests are drawn towards the seat back 144 and aligned with the seat bottom 142 as shown in FIG. 7. In some embodiments, when the seat back angle θ approaches zero, the foot rest 150 is completely drawn backward and adjacent to the seat bottom 142, as shown in FIG. 8.

The underside of seat 140 according to some embodiments of the invention is provided with a seat connector 164 adapted to fit within and engage the elements of seat support structure 126 spaces 132 in the seat support structure 126. According to the embodiment illustrated in FIG. 9 for example, seat connector 164 may be a cylindrical boss extending from the underside 166 of the seat 140, although one of ordinary skill in the art would recognize that other shapes may be suitable. The cylindrical seat connector 164 as illustrated is sized to fit within space 132 of the seat support structure 126 supported for selectable and may be supported for controllable rotation about an axis of the seat support structure 126.

Seat connector 164 is configured to allow full 360° rotation about an axis of the seat support structure 126 according to embodiments of the present invention. A locking mechanism (not shown) may be provided in some embodiments to at least temporarily restrict rotation of the seat connector 164, and therefore the seat 140, about the seat support structure 126. In some embodiments, the locking mechanism may restrict rotation of the seat connector 164 at predetermined rotational positions. In other embodiments, the locking mechanism may restrict rotation of the seat connector 164 at any rotational position selected by the user or operator.

For convenience and ease of illustration, spaces 132 have been shown and described as spaces within the support structure and the seat connector 164 has been described as extending from the underside of the seat 140. However, one of ordinary skill in the art will recognize that the locations may be changed without affecting the function of the elements. For instance, the underside of the seat 140 may be provided with a cavity similar to space 132 and the seat support structure may have a boss extending therefrom, similar to the seat connector 164. Functional and design benefits may be realized from either configuration. Design considerations may influence the choice of configuration.

Figure 9:
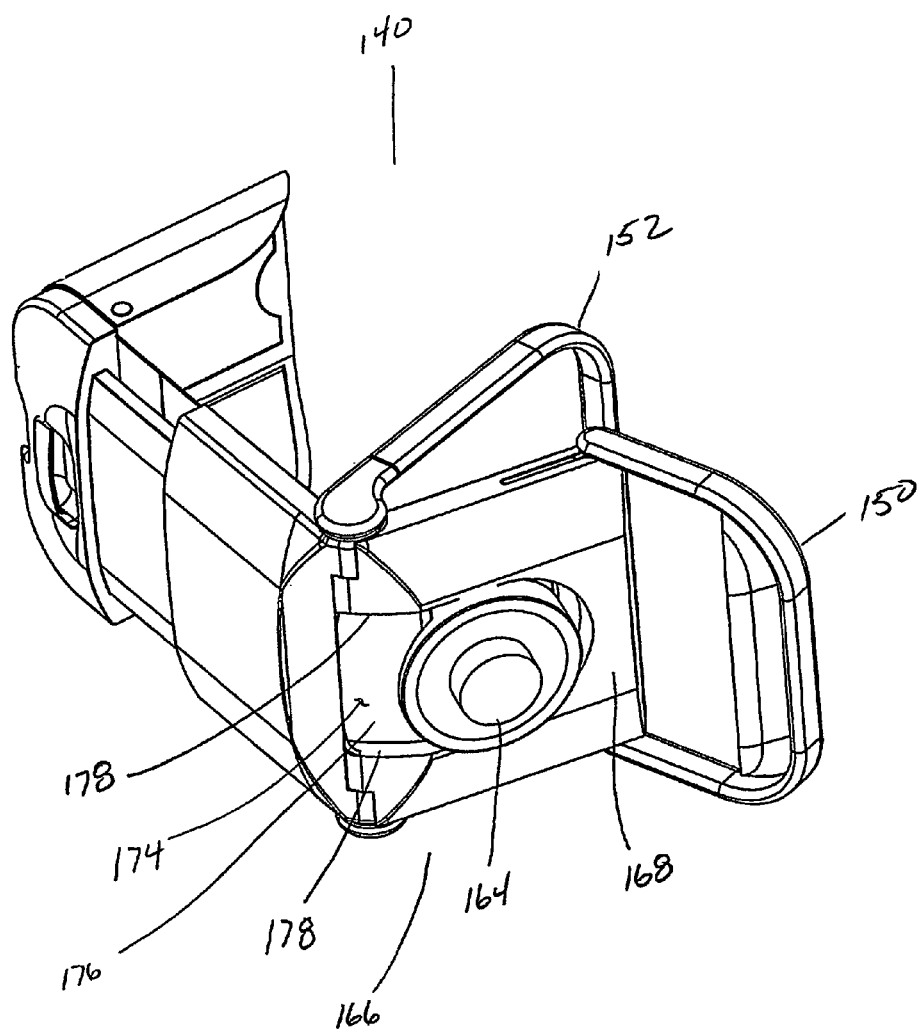
FIG. 9 is a perspective view of the underside of the seat of FIG. 5.
Figure 10:
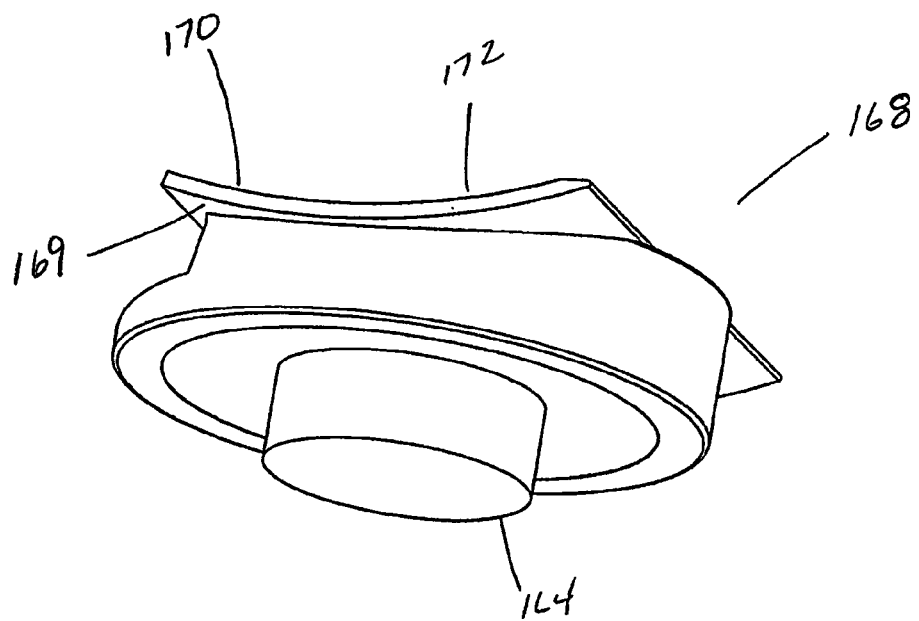
FIG. 10 is a perspective view of the swivel plate according to an embodiment of the invention.

According to at least the embodiment shown in FIG. 9, seat connector 164 is connected to, or formed with, swivel plate 168, as shown more clearly in FIG. 10. Swivel plate 168 may include a swivel plate surface 170 shaped to closely engage at least a portion of the underside 166 of the seat 140 along a seat swivel surface 174. Swivel plate surface 170 may have a friction modifying surface 172 applied thereto. By way of non-limiting examples, the friction modifying surface 172 may be in the form of a coating, film, sheet, plate, laminate, spray, paste, liquid film, surface treatment, surface modification, or an application of any friction modifying material in the form of a solid, semi-solid, or liquid, applied to the swivel plate surface 170 to modify the frictional characteristics of at least the interface between the swivel plate surface 170 and the seat swivel surface 174. The friction modifying surface 172 may comprise one or more materials in one or more forms as generally known to the art. A friction modifying surface may be applied to the seat swivel surface 174 instead of, or in addition to, applying the friction modifying surface 170 to swivel plate surface 170. In embodiments where a friction modifying surface is applied to the seat swivel surface 174 and the swivel plate surface 170, the friction modifying surfaces may be the same or may be different from one another in composition or form.

Swivel plate 168 may be retained within seat swivel cavity 176 formed at least partially by seat swivel surface 174 and side walls 178 according to some embodiments of the invention. The swivel seat cavity 176 may be formed in the underside 166 of the seat bottom 142, the seat back 144, or in both the seat bottom 142 and the seat back 144. In some embodiments, at least side walls 178 of cavity 176 may be configured to allow controlled sliding of swivel plate 168 within seat swivel cavity 176. One or more side walls 178 of cavity 176 may be formed with a structure to engage at least a portion of swivel plate lip 169. The engagement urges swivel plate surface 170 into contact with seat swivel surface 174 and constrains sliding movement. Although a lip and an engagement surface are specifically disclosed, many other configurations may be suitable as recognized by one of ordinary skill in the art.

Alternately, but functionally similar to the embodiment described above, seat swivel surface 174 may be formed on the underside 166 of the seat bottom 142, the seat back 144, or both, and projections (not shown) may extend from the seat bottom 142 and/or the seat back 144 to engage swivel plate lip 169 for controlled sliding of swivel plate 168 on seat swivel surface 174. The projections may function as the side walls 178 of cavity 176 in the embodiment above. Additional elements, such as projections in a non-limiting example, may be present to further limit the travel of the swivel plate 168.

Swivel plate surface 170, seat swivel surface 174, and cavity side walls 178 may cooperate in some embodiments to allow seat 140 to swivel into a reclined position independent of, and without altering, the relative position of the seat bottom 142 and the seat back 144 with respect to each other. That is, the angular measure θ is independent of, and may remain constant, as the seat 140 swivels into a reclined position.

Swivel plate surface 170 and seat swivel surface 174 may be comprised of linear, curvilinear, or linear and curvilinear segments to provide the desired path for the seat as the seat swivel surface 174 moves over the swivel plate surface 170. Friction modifying surface 172 may conform to the underlying surface of either the swivel plate surface 170 or the seat swivel surface 174. Alternately, the friction modifying surface 172 may differ from the underlying profile. In some embodiments, at least a portion of the friction modifying surface 172 is comprised of the required linear, curvilinear, or linear and curvilinear segments to provide the desired path for the seat as the seat swivel surface 174 moves over the swivel plate surface 170.

Figure 11:
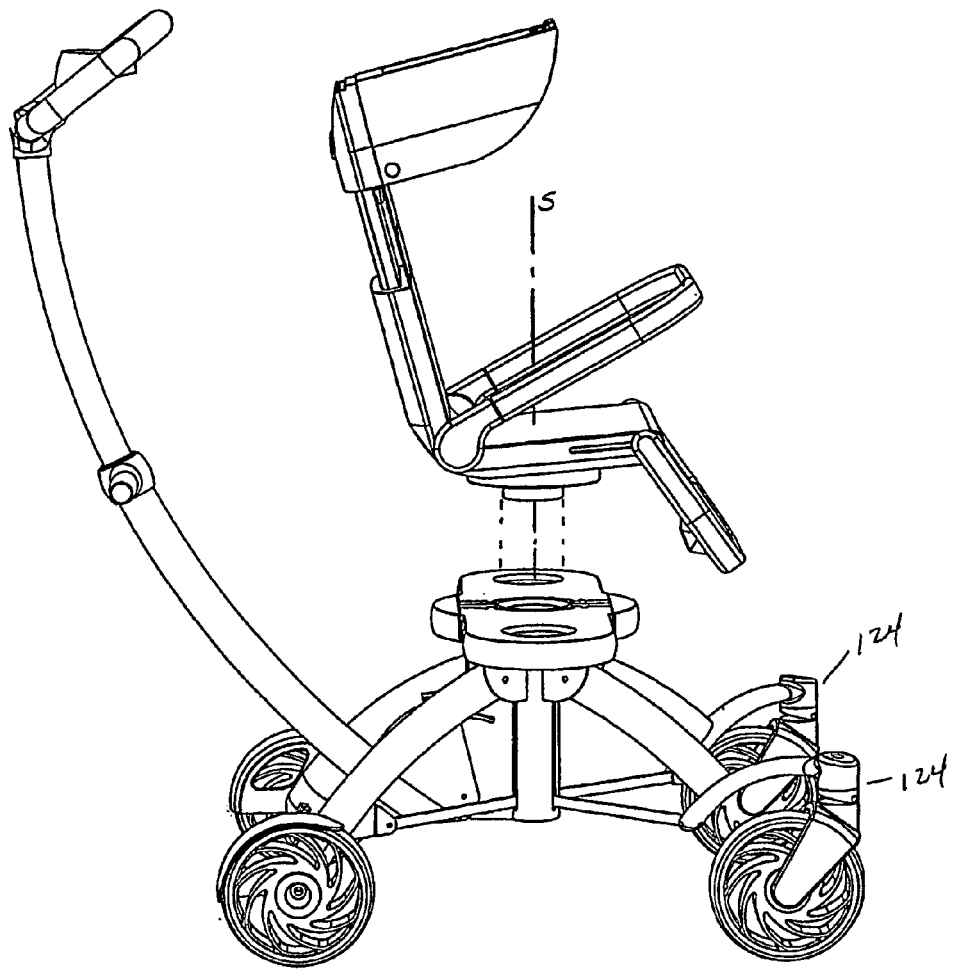
FIG. 11 is a perspective view of the stroller frame of FIG. 4 and the seat of FIG. 5 aligned for assembly.

In some embodiments, at least one seat 140 having a seat connector 164 is mounted to seat support structure 126. Seat connector 164 may be placed within space 132 of the seat support structure 126 and supported for controlled and selectable rotation about a seat axis S as shown in FIG. 11. Rotation of the seat is controlled in that user intervention is necessary to rotate the seat about the seat axis S. Rotation is selectable in some embodiments in that a locking device (not shown) may be provided to at least temporarily fix the rotational position of the seat 140 about axis S. The locking device may, in a non-limiting example, arrest rotation of the seat at preselected rotational positions. Further rotation may be prevented by the locking device until some purposeful action is taken to release the seat 140 for rotation until the next preselected position is reached. In other embodiments, the locking device may, upon disengaging the device, allow rotation of the seat about axis S until a user selected position is reached at which point the seat 140 may be fixed in that position. Other methods of temporarily arresting/allowing rotation of the seat would be obvious to the artisan and would be within the scope and spirit of the invention.

Figure 12:
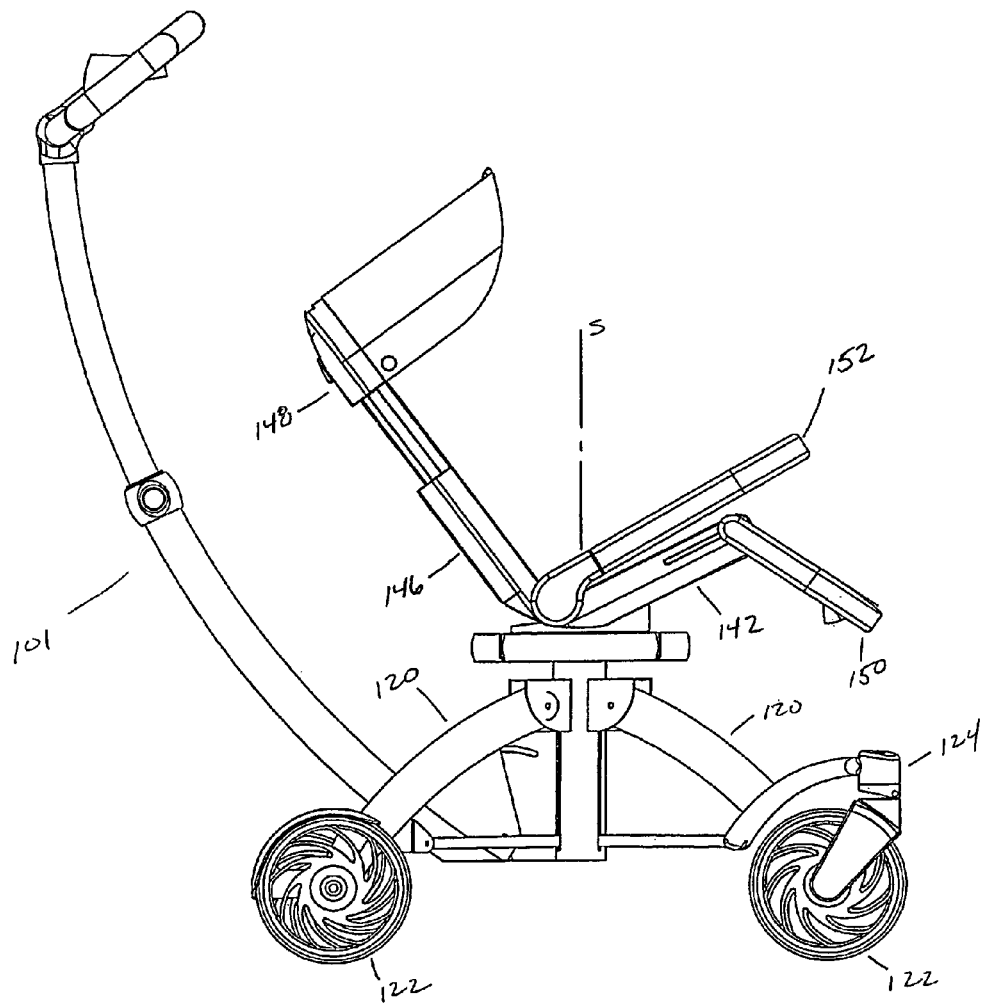
FIG. 12 is a side view of a stroller with the seat partially reclined according to an embodiment of the invention.

In some embodiments, seats 140 may include swivel plate 168, swivel plate surface 170, and seat connector 164. At least a portion of the seat swivel surface 174 may be shaped and configured to allow seat 140 to swivel into a reclined position as disclosed above and illustrated in FIG. 12. Accordingly, in some embodiments, seat 140 may be configured to rotate about axis S and recline along the path determined by the interface of swivel plate surface 170 and seat swivel surface 174. The rotational position about axis S and the swivel position are independent of each other according to some embodiments of this invention.

In some embodiments, the swivel plate surface 170 and the seat swivel surface 174 are shaped and configured to slidably interact such that the center of mass for the seat 140 remains approximately aligned with the seat axis S as the seat reclines along the path determined by the interacting surfaces. In other embodiments, the swivel plate surface 170 and the seat swivel surface 174 are shaped and configured to interact such that the center of mass for the seat 140 with a seated and properly restrained child remains approximately aligned with the seat axis S as the seat reclines along the path determined by interacting surfaces.

According to some embodiments, the inventive stroller may be configured in a plurality of configurations as desired. Configurations comprising two seats are shown here for convenience only. Other configurations of one seat or more than two seats are contemplated and are within the scope and spirit of the disclosure.

Figure 13:
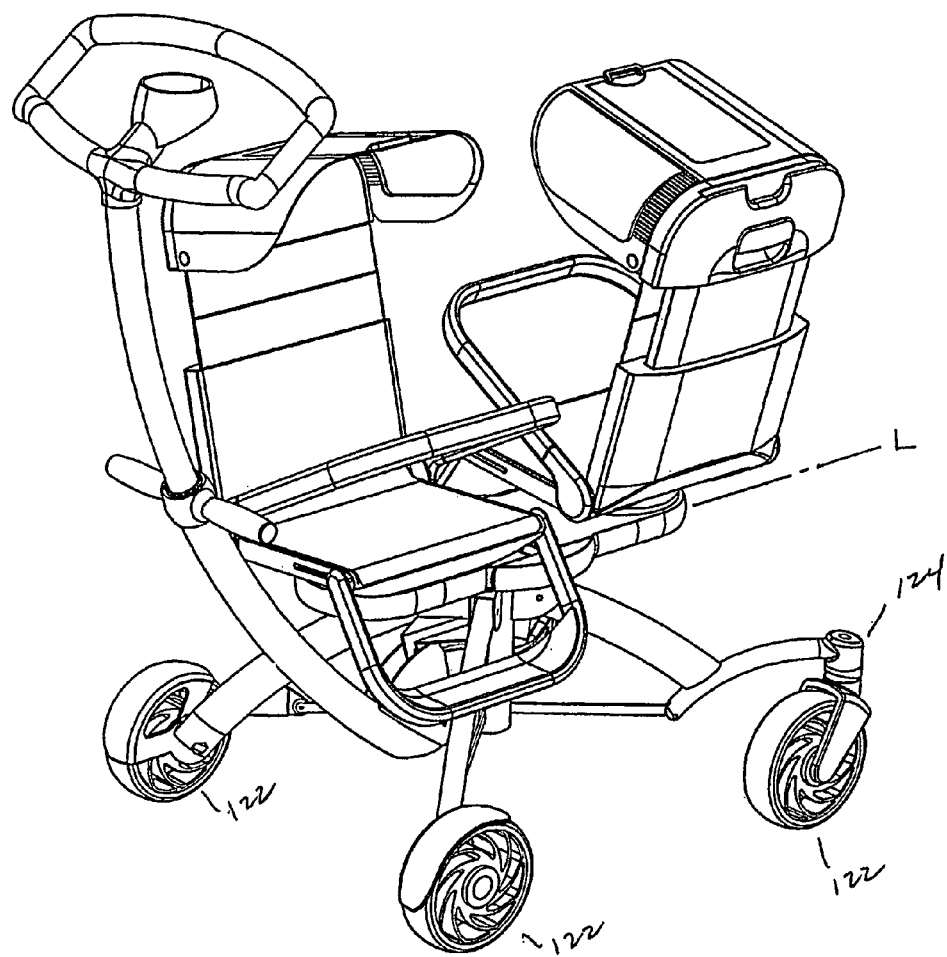
FIG. 13 is a perspective view of a stroller according to an embodiment of this invention with transverse mounted, opposite-facing seats.
Figure 14:
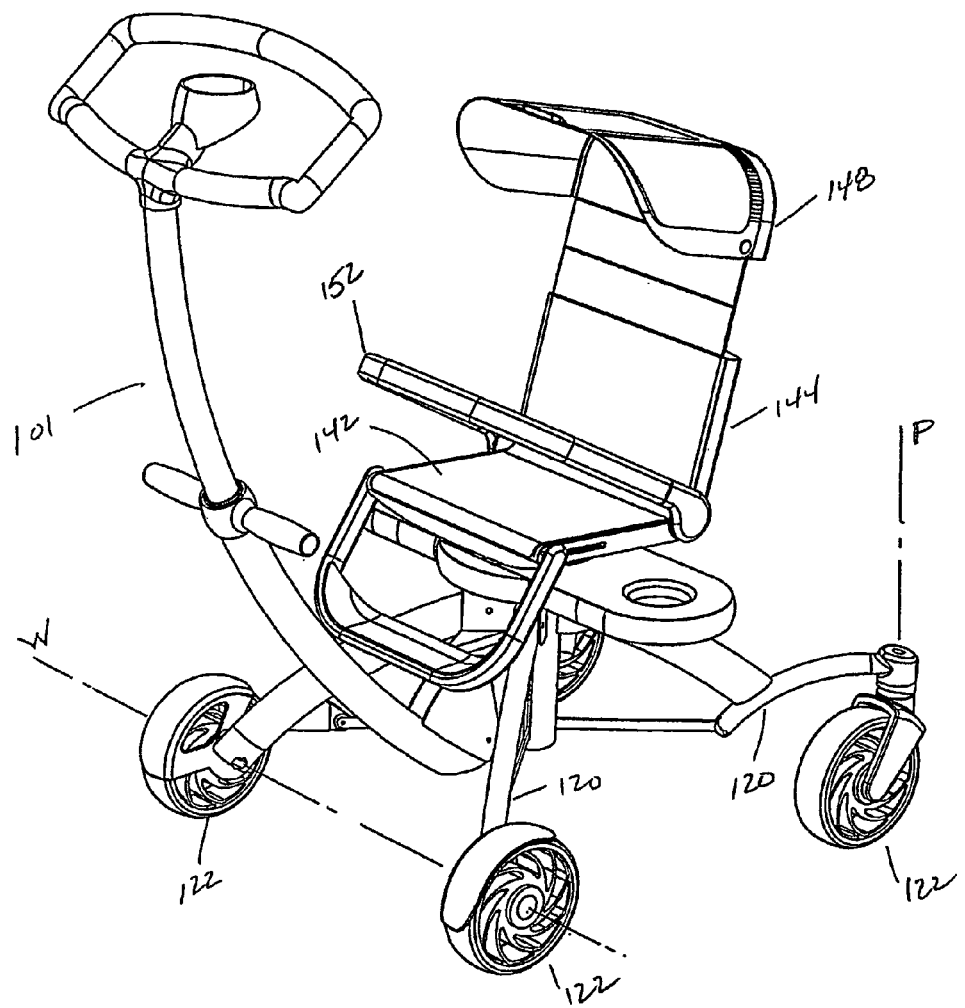
FIG. 14 is a perspective view of a stroller according to an embodiment of the invention.

Seat support structure 126 may be aligned with the longitudinal axis L providing support for two seats 140 along the longitudinal axis L of the stroller frame. Exemplary configurations include two seats 140 transversely mounted oppositely facing on the stroller frame 100 as shown in FIG. 13. FIG. 14 illustrates an embodiment in which one seat is longitudinally mounted in-line, facing rearward. Alternately, the seat 140 of FIG. 14 may be positioned to face forward, aligned with the longitudinal axis L of the stroller frame 100.

Figure 15A:
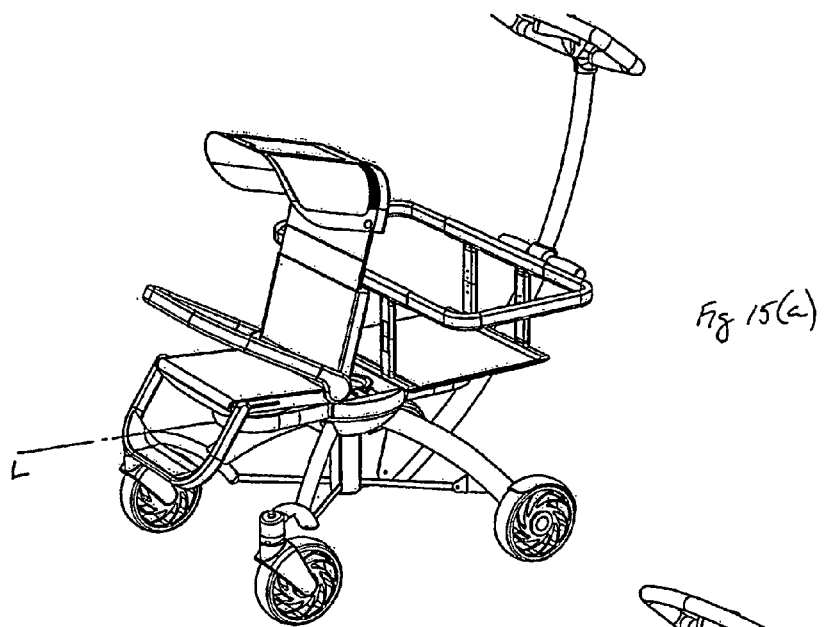
FIG. 15(*a*) is a perspective view of a stroller according to an embodiment of this invention with an alternate seating arrangement.
Figure 15B:
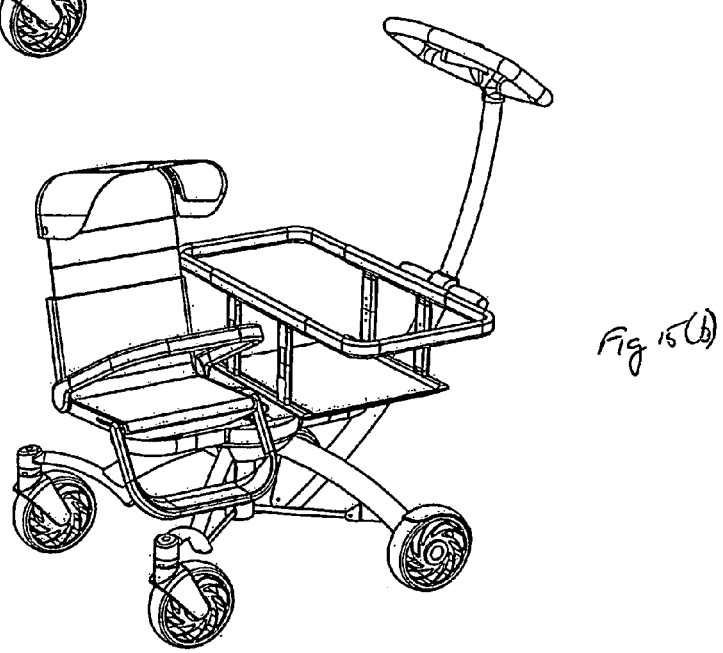

FIGS. 15(*a*) and 15(*b*) are illustrative of a configuration in which one seat is a bassinet transversely mounted to the stroller frame and one seat is facing forward (FIG. 15(*a*)) or facing transverse (FIG. 15(*b*)) to the longitudinal axis L of the stroller frame 100.

Figure 16:
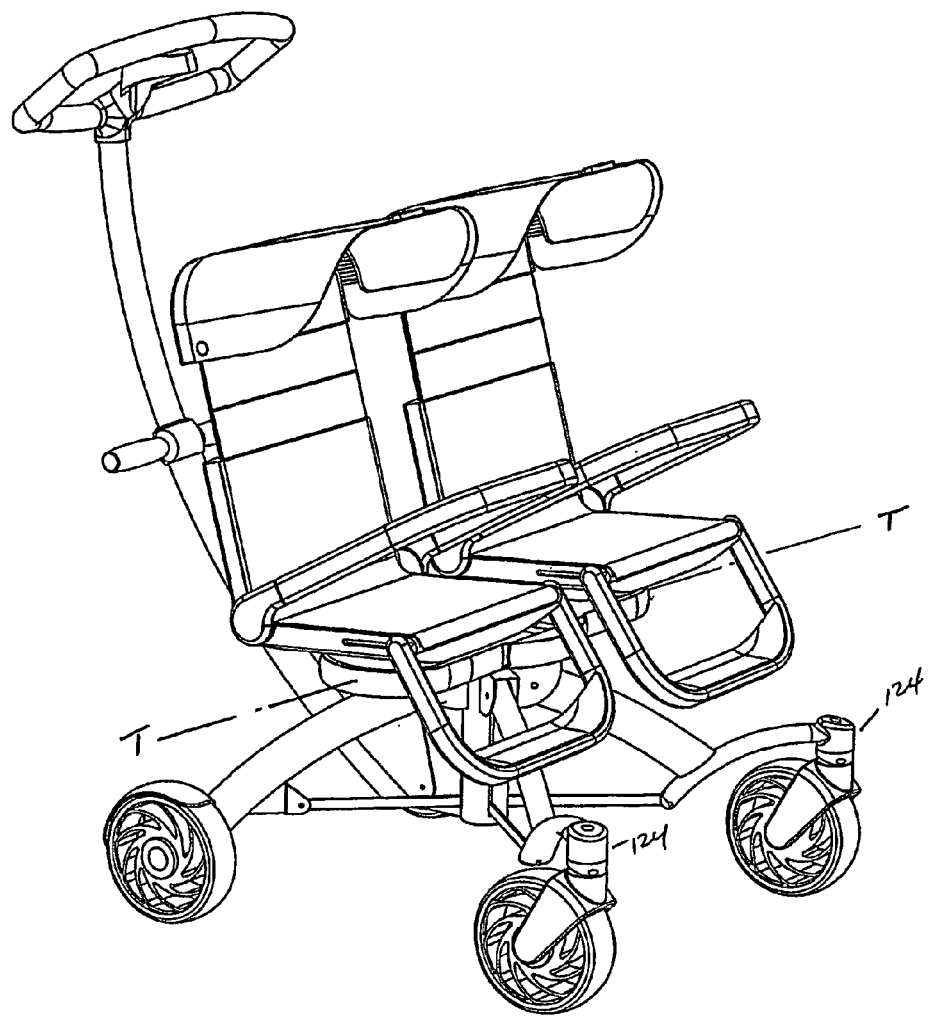
FIG. 16 is a perspective view of a stroller according to an embodiment of this invention with two seats facing forward.
Figure 17:
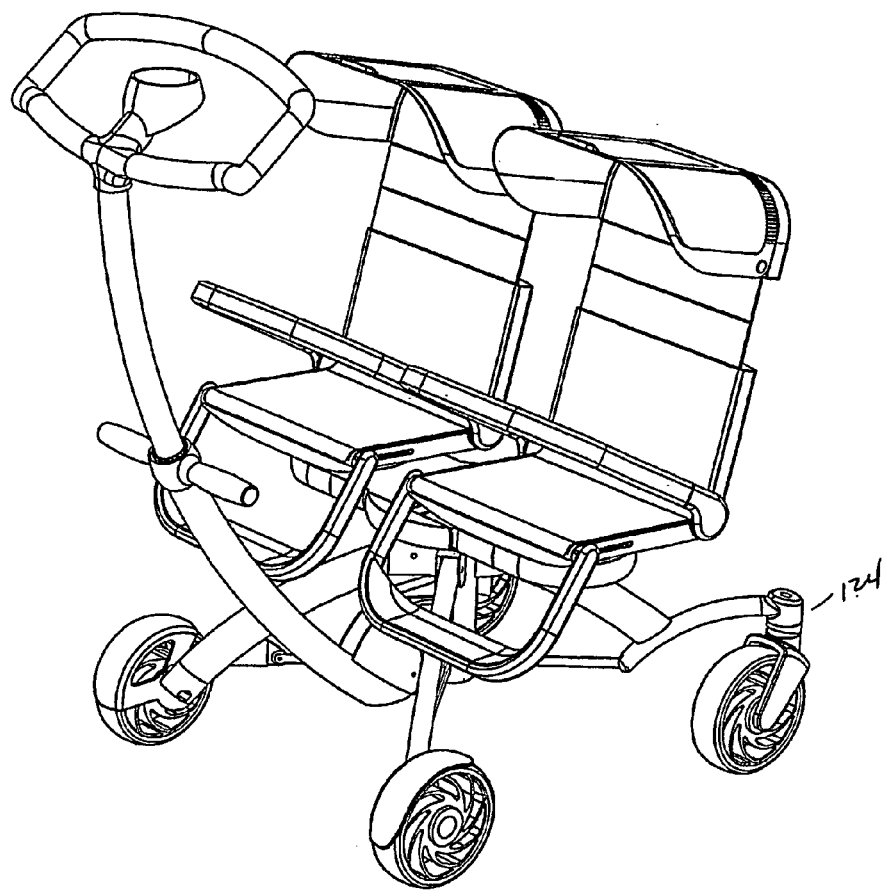
FIG. 17 is a perspective view of a stroller according to an embodiment of this invention with two seats facing rearward.
Figure 18:
FIG. 18 is a is a perspective view of a stroller according to an embodiment of the invention with seats partially folded.

Aligning seat support structure 126 with the transverse axis T of the stroller frame 100 provides the exemplary configuration as illustrated in FIG. 16. FIGS. 15(*a*), 15(*b*), and 16 illustrate a double stroller, with non-limiting exemplary seating configurations according to embodiments of the invention.

Figure 19:
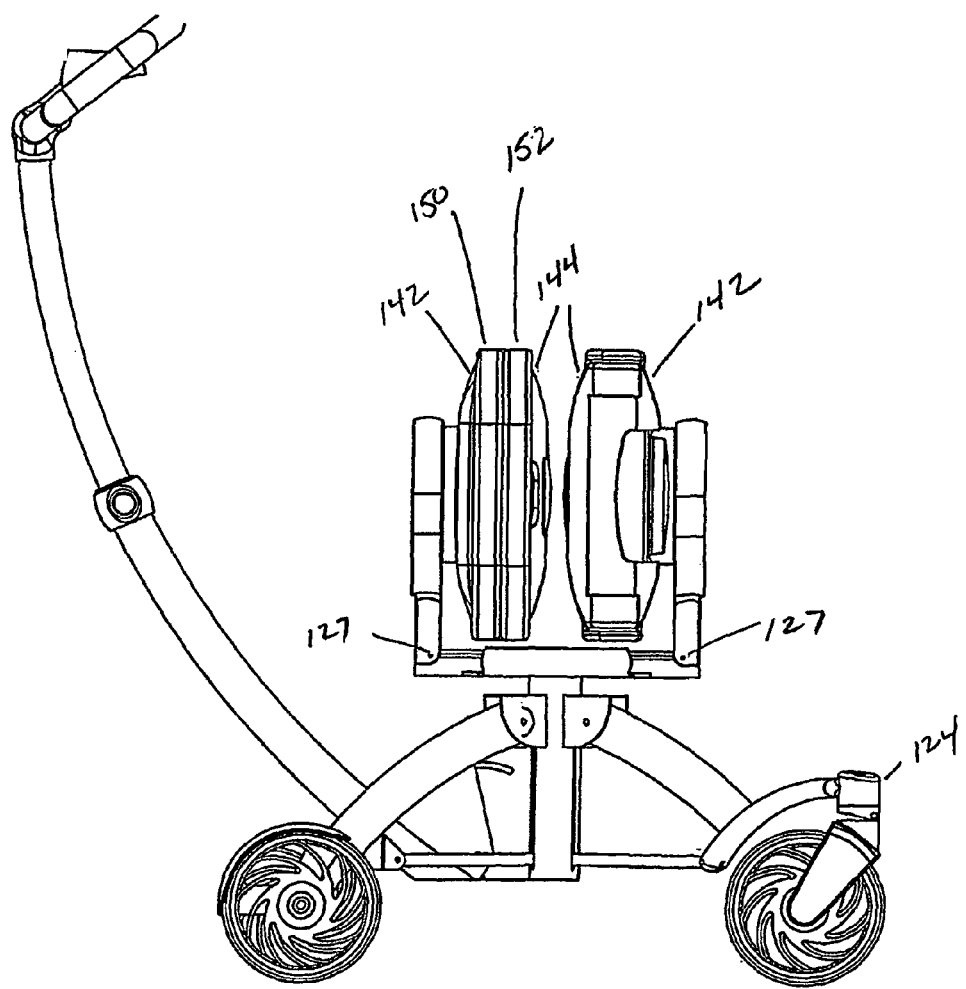
FIG. 19 is a side view of a stroller according to an embodiment of this invention in a partially folded configuration.

In some embodiments, a stroller frame 100 with one or more seats 140 mounted thereto is collapsible upon activation of the collapsing mechanism discussed above. To facilitate collapsing the stroller, seats 140 can be folded into a storage position as shown in FIGS. 8 and 19. To facilitate the folding of an embodiment of the stroller frame 100 with seats 140 mounted thereon, the seats 140 may be folded as shown in FIG. 8 and described above. A seat folded as shown has a seat bottom 142 oriented substantially parallel to seat back 144. As shown, the seat bottom 142 and the seat back 144 are parallel and vertically oriented in FIG. 19. The footrest 150 may be withdrawn against the seat bottom 142 as previously described. Seats 140 folded as shown and described present the seat bottom 142 and seat back 144 as exposed external surfaces with the seating surfaces within the external surfaces.

To further facilitate the folding of the stroller with one or more seats 140, in some embodiments, a seat support structure 126 comprising pivots 127 may fold along a common pivot line as shown in FIG. 19. Folded thus, at least part of the seat back 144 is aligned substantially vertically and facing inward, toward the axis V of the central shaft 102.

As the collapsing mechanism is activated, the leg second ends 120(*b*) are drawn inward, toward the central shaft 102 by stretchers 134, causing leg first ends 120(*a*) to pivot about the axis provided in the associated leg flange 108. As leg second ends 120(*b*) are drawn inward, the axis W of at least some of the wheel assemblies 122 is canted away from the initial horizontal orientation to a non-horizontal orientation, as shown in a non-limiting example in FIG. 13. In folded configuration as illustrated in FIG. 13, the canted wheel axis W prevents the wheel assemblies 122 from rotating about their axis W. A latching mechanism may be provided within the collapsing mechanism to constrain the legs 120 from unintended movement from the collapsed position.

Figure 20:
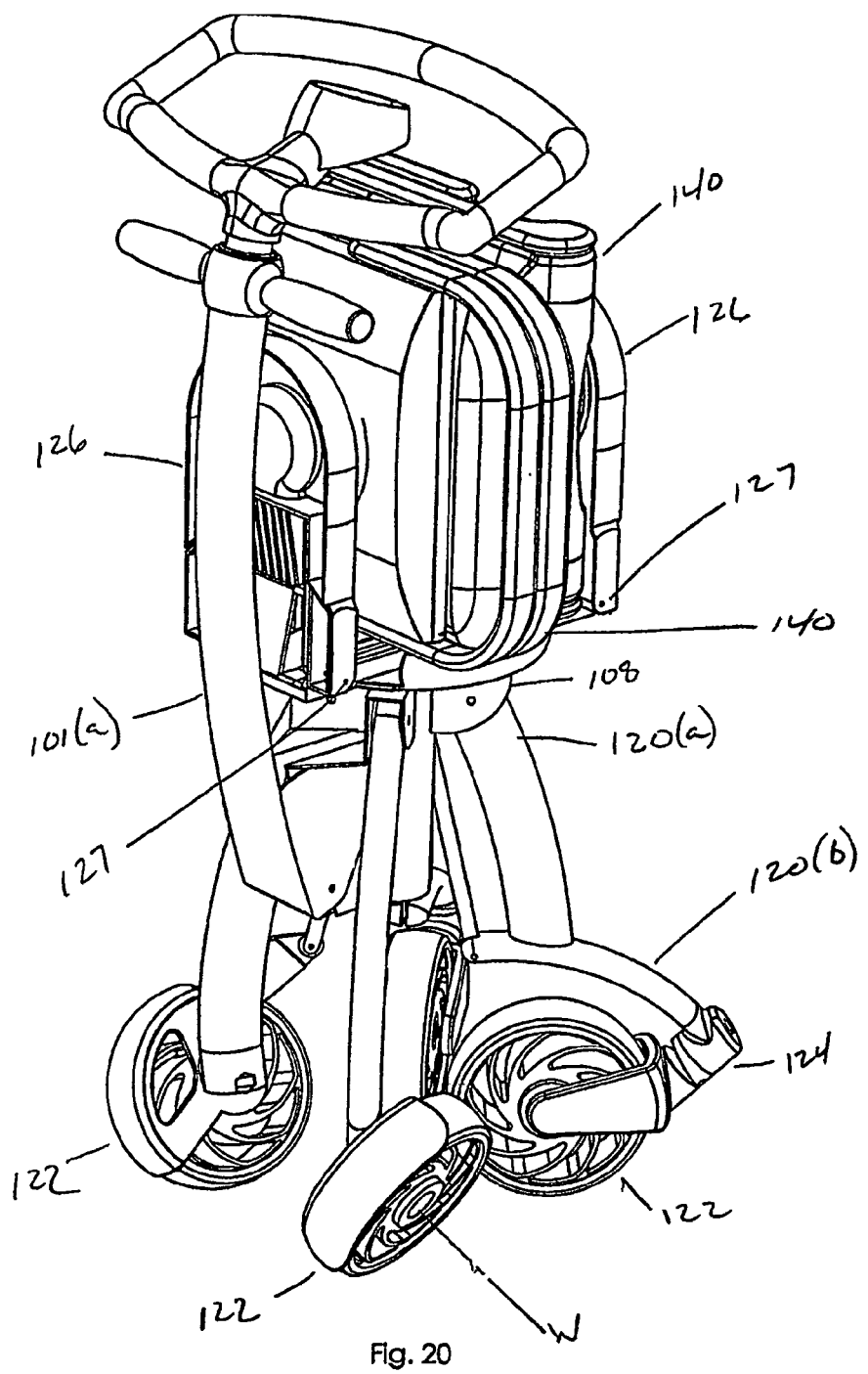
FIG. 20 is a is a perspective view of a stroller in a fully folded configuration according to an embodiment of the invention.

According to some embodiments of the invention, handle section 101(*c*) may be withdrawn into handle portion 101(*a*) for storage. A fully collapsed stroller frame 100, handle 101, and seats 140 as illustrated in FIG. 20 occupies a volume of approximately 16.5"×16.5"×40.1" for storage or transport.

Figure 21:
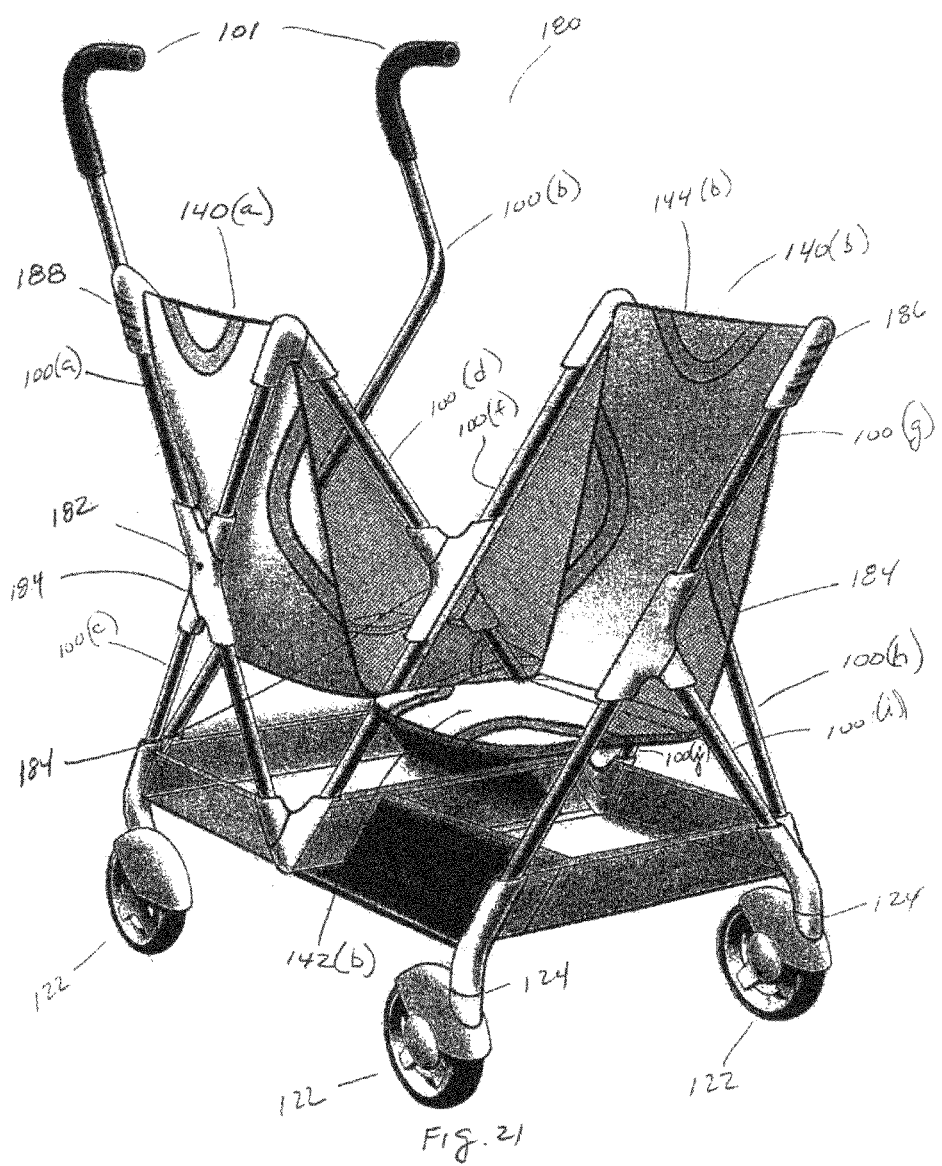
FIG. 21 is a perspective view of a stroller in accordance with an embodiment of the present invention with a frame in a fully opened position.

FIG. 21 illustrates an umbrella-type stroller 180 according to an embodiment of the present invention in which two seats 140 are mounted to a frame comprised of frame elements 100(*a*)-100(*j*). Note: frame element 100(*e*) is hidden in the figure but extends from end 188 of frame element 100(*a*) generally parallel to frame element 100(*d*). At least frame elements 100(*a*)-100(*e*) form a support structure for a first transverse mounted seat 140(*a*). Similarly, a support structure for a second transverse mounted seat 140(*b*) is comprised of frame elements 100(*f*)-100(*j*). Seat 140(*b*) may be comprised of a flexible seat back 144(*b*) and a flexible seat bottom 142(*b*). Seat 140(*a*) is comprised of similar elements which are hidden from view.

Umbrella-type stroller 180 may comprise handles 101 affixed to the frame, for example to frame elements 100(*a*) and 100(*b*) as shown. A plurality of wheel assemblies 122 may be mounted to the frame, and at least some of the wheel assemblies may be mounted to the frame with pivoting mounts 124.

Figure 22:
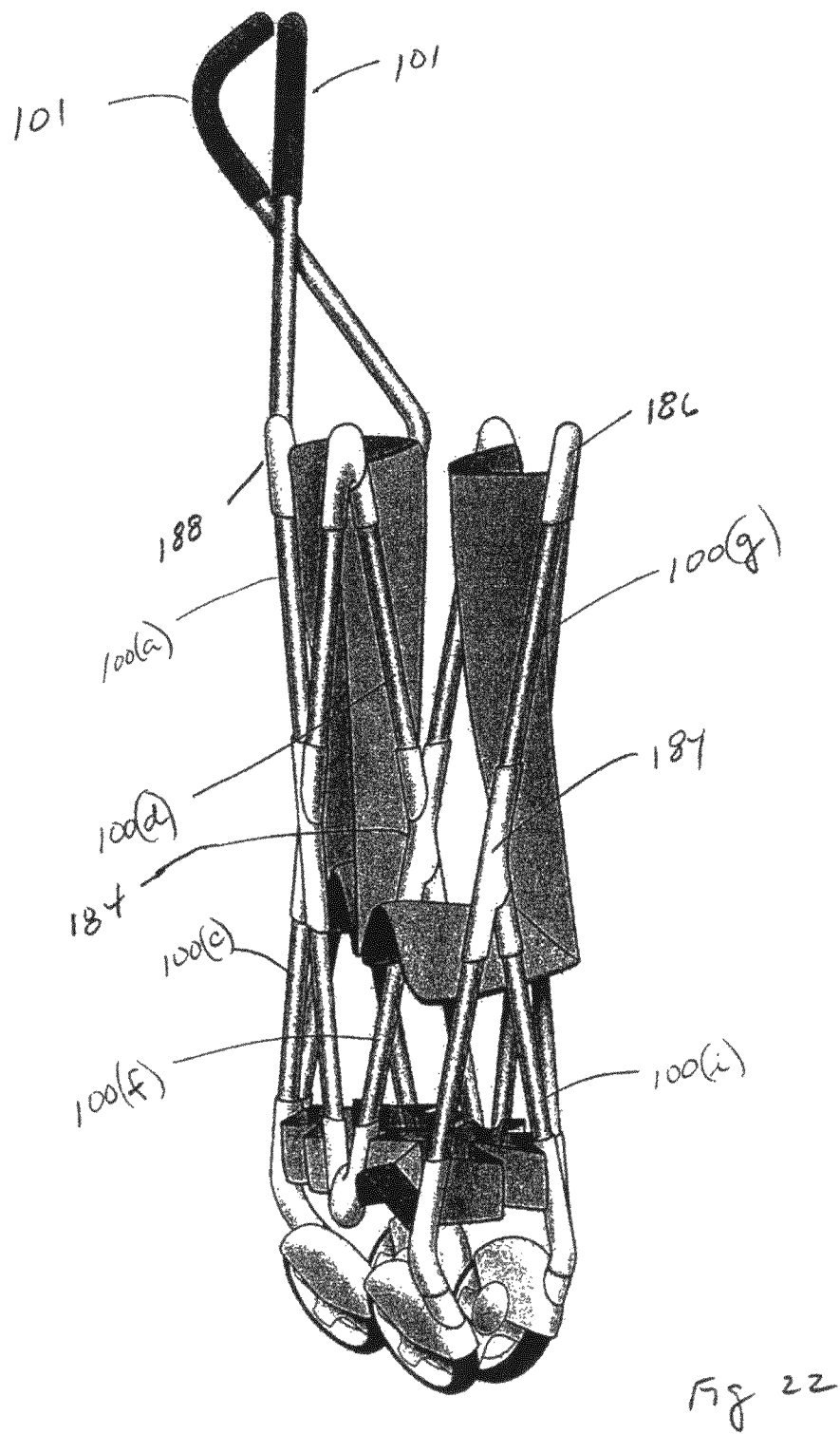
FIG. 22 is the stroller of FIG. 21 with the frame fully collapsed.

Intersecting frame element pairs may be provided with scissor-type pivot points to allow controlled pivoting motion about a point of intersection. As shown in FIG. 21, for example, frame elements 100(*a*) and 100(*c*) intersect at 182 and are constrained for pivoting movement by pivot or hinge 184. Similar pivoting relationships are supported at other points of intersection, such as, for example, the intersection of frame elements 100(*d*) and 100(*f*), and 100(*g*) and 100(*i*), and 100(*j*) and 100(*h*) (hidden) with a pivot or hinge 184 or similar structure provided at the points of intersection. Such pivoting relationships facilitate the opening and collapsing of the stroller 180 frame. For instance, from a fully opened position as illustrated in FIG. 21, the stroller 180 may collapse to a fully collapsed configuration as shown in FIG. 22.

Frame elements pairs provided with pivot points as described above may be arranged with the axis of rotation of pivot or hinge 184 substantially aligned with the transverse axis or the longitudinal axis of the umbrella-type stroller. Stroller frame elements 100(*a*) and 100(*c*) are shown with the axis substantially aligned with the transverse axis of the stroller frame. Stroller frame elements 100(*d*) and 100(*f*) are shown with their axis substantially aligned with the longitudinal axis of the stroller frame. Frame element pairs arranged with their axis of rotation aligned with the transverse direction may allow the stroller frame to collapse in the longitudinal direction. Frame element pairs arranged with their axis of rotation aligned with the longitudinal direction may allow the stroller frame to collapse in the transverse direction.

Collapsing of the stroller may be brought about by grasping an end 186 of frame element 100(*g*) and an end 188 of frame element 100(*a*) and urging the ends towards each other. Bringing ends 186 and 188 towards each other may result in the seat bottoms 142(*b*) and seat backs 144(*b*) collapsing as frame element 100(*g*) approaches frame element 100(*f*) (and 100(*d*) approaches 100(*e*) (hidden)) in the longitudinal direction of the frame. Simultaneously, or as a separate motion, frame elements such as 100(*d*) and 100(*f*) may pivot about hinge 184 to bring elements 100(*d*) and 100(*f*) in closer vertical alignment with each other as the stroller 180 collapses into a collapsed configuration as shown in FIG. 22.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A stroller comprising:
    a folding frame having a handle, a plurality of wheels, a seat support structure, a frame vertical axis, a frame longitudinal axis, and a frame transverse axis;
    two seats, each having a seat bottom and seat back, a seat longitudinal axis and a seat vertical axis, the seats supported on the folding frame; wherein the seats are supported such that the longitudinal axis of each of the seats is perpendicular to the frame longitudinal axis and wherein said seat backs have a first piece and a second piece, said first piece and said second piece slidably connected to one another; said first piece of said seat back being hingedly connected to said seat bottom such that said seat back and said seat bottom have a first seat position and a second seat position, wherein, in said first seat position, said seat back and said seat bottom have an open configuration for sitting, and wherein, in said second seat position, said seat back and said seat bottom have a closed configuration for storage; said second piece of said seat back being connected to said first piece of said seat back such that said first piece of said seat back and said second piece of said seat back have a first backrest position and a second backrest position, wherein, in said first backrest position, said first piece of said seat back and said second piece of said seat back are extended relative to one another to increase seat back area for sitting, wherein, in said second backrest position, said first piece of said seat back and said second piece of said seat back are retracted relative to one another for storage; and,
    at least one footrest depending from each said seat bottom and attached with a sliding and pivoting connection such that said at least one extendable and retractable footrest and said seat bottom have a first footrest position and a second footrest position, wherein, in said first footrest position, said at least one footrest is extended away from said seat bottom for use as a footrest during sitting, wherein, in transitioning to said second footrest position, said at least one footrest slides along the longitudinal seat axis while pivoting upward toward said seat bottom for storage.

2. A stroller according to claim 1 wherein the folding frame and the two seats are configured such that, in an unfolded condition, the length measured in the direction of the frame longitudinal axis is no greater than about 35 inches and the width measured in the direction of the frame transverse axis is no greater than about 30 inches.

3. A stroller according to claim 1 wherein the folding frame and the two seats are configured such that, in an unfolded condition, the length measured in the direction of the frame longitudinal axis is within a range of about 16-30 inches and the width measured in the direction of the frame transverse axis is within a range of about 16 to about 25 inches.

4. A stroller according to claim 1 wherein the folding frame and the two seats are configured such that, in an unfolded condition, the length measured in the direction of the frame longitudinal axis is within a range of about 28-30 inches and the width measured in the direction of the frame transverse axis is no greater than about 23 to about 25 inches.

5. The stroller according to claim 1 wherein the two seats are supported on the seat support structure for selectable rotation about the vertical axis of the seat.

6. The stroller according to claim 5 further comprising a locking device configured to selectively lock and release the two seats for selectable rotation about the vertical axis of the seat.

7. The stroller according to claim 5 wherein the seat support structure is supported on the folding frame for rotation about a vertical axis of the frame.

8. The stroller according to claim 7 further comprising a locking device configured to selectively lock and release the seat support structure for selectable rotation about the vertical axis of the frame.

9. A stroller for at least two children comprising:
a folding frame having a handle, a plurality of wheels, a frame vertical axis, a frame longitudinal axis, and a frame transverse axis;
two seats, each having a seat bottom, a seat back, a seat longitudinal axis and a seat vertical axis, comprising: a longitudinal axis; a first end portion; and a second end portion; wherein the first and second end portions lie along the longitudinal axis; the seat support structure aligned with the longitudinal axis of the folding frame and supported thereon; a first seat having a seat vertical axis generally parallel to the frame vertical axis, a seat longitudinal axis, and a seat transverse axis, the first seat supported on the first end portion of the seat support structure such that the seat longitudinal axis is perpendicular to the frame longitudinal axis; a second seat having a second seat vertical axis generally parallel to the frame vertical axis, a second seat longitudinal axis, and a second seat transverse axis, the second seat supported on the second end portion of the seat support structure such that the seat longitudinal axis is perpendicular to the frame longitudinal axis and wherein, in a first seat position, said seat back and said seat bottom have an open configuration for sitting, and wherein, in said second seat position, said seat back and said seat bottom have a closed configuration for storage; said second piece of said seat back being connected to said first piece of said seat back such that said first piece of said seat back and said second piece of said seat back have a first backrest position and a second backrest position, wherein, in said first backrest position, said first piece of said seat back and said second piece of said seat back are extended relative to one another to increase seat back area for sitting, wherein, in said second backrest position, said first piece of said seat back and said second piece of said seat back are retracted relative to one another for storage; and,
at least one extendable and retractable footrest depending from each said seat bottom and attached with a sliding and pivoting connection such that said at least one footrest and said seat bottom have a first footrest position and a second footrest position, wherein, in said first footrest position, said at least one footrest is extended away from said seat bottom for use as a footrest during sitting, wherein, in transitioning to said second footrest position, said at least one footrest slides along the longitudinal seat axis while pivoting upward toward said seat bottom for storage.

10. The stroller according to claim 9 wherein the first seat is supported on the first end portion of the seat support structure for controlled rotation about the first seat vertical axis; and the second seat is supported on the second end portion of the seat support structure for controlled rotation about the second seat vertical axis.

11. The stroller according to claim 10 further comprising: a locking device configured to selectively lock and release the first seat for selectable rotation about the vertical axis of the first seat; a locking device configured to selectively lock and release the second seat for selectable rotation about the vertical axis of the second seat.

12. The stroller according to claim 9 wherein the seat support structure is supported on the folding frame for rotation about a vertical axis of the frame.

13. The stroller according to claim 9 wherein the handle further comprises a first portion; a second portion; and, a third portion such that at least the second portion selectively extends or collapses into the first position.

14. The stroller according to claim 12 further comprising: a locking device configured to selectively lock and release the seat support structure for selectable rotation about the vertical axis of the folding frame.

15. The stroller according to claim 9 wherein the folding frame further comprises: a partially hollow central shaft comprising an upper end portion and a lower end portion distal from the upper end portion; a plurality of legs having a first end portion and a second end portion wherein the first end portions of the plurality of legs are radially distributed around a perimeter of the central shaft and pivotably attached thereto; a plurality of wheel assemblies including wheels mounted to at least some of the second end portions of the plurality of legs wherein the wheels are configured to rotate about an axis of the wheel; a collapsing mechanism mounted to the central shaft; a plurality of stretchers having a first end operatively connected to the collapsing mechanism and a second end operatively connected to the second end of the legs, wherein, upon activation of the collapsing mechanism, the second end of the stretchers draw the second end of the legs inward to a collapsed position.

16. The stroller according to claim 9 wherein the seat support structure further comprises: at least one hinge line intermediate to the first end portion and the second end portion such that at least a portion of the seat support structure folds along the hinge line to a substantially vertical position.

17. The stroller according to claim 9 wherein at least one of the first seat and second seat further comprises: a seat bottom having an upper surface, a lower surface, a front edge, a back edge, and a cavity formed within the body extending from the front edge towards the back edge and opened at least at the front edge; a seat back comprising: a head rest; and a back rest having an upper edge and a lower edge; at least one footrest depending from the front edge of the seat bottom; wherein the lower edge of the back rest and the back edge of the seat bottom are pivotably connected such that the seat back and the seat bottom may selectably form an included angle between about 0 degrees and about 180 degrees.

18. The stroller according to claim 16 wherein a portion of the at least one footrest is operatively linked to the seat back wherein, upon pivoting the seat back about the seat bottom such that the included angle approaches 0.degree., at least a portion of the at least one footrest is withdrawn into the cavity formed within the seat bottom.

19. The stroller according to claim 16 wherein the at least one of the first seat and second seat further comprises: a swivel plate comprising: a seat connector; and a swivel plate having a swivel plate surface; a seat swivel surface formed on at least a portion of the seat lower surface; wherein the seat connector is configured to be accepted in one of the first and second cavities for controlled rotation about the seat vertical axis.

20. The stroller according to claim 18 wherein the swivel plate surface and the seat swivel surface are configured to cooperate in a sliding relationship such that the seat vertical axis may divert from the frame vertical axis as the seat assumes a reclined orientation.

21. A stroller comprising:
a stroller frame;
and a seat, the seat comprising a seat bottom and a seat back; the seat adapted for mounting to the stroller frame; wherein the seat further comprises a reclining mechanism adapted to recline the seat between at least a first position and a second position such that a seat center of mass is maintained substantially aligned with a vertical axis of the stroller, wherein, in said first seat position, said seat back and said seat bottom have an open configuration for sitting, and wherein, in said second seat position, said seat back and said seat bottom have a closed configuration for storage; said second piece of said seat back being connected to a first piece of said seat back such that said first piece of said seat back and a second piece of said seat back have a first backrest position and a second backrest position, wherein, in said first backrest position, said first piece of said seat back and said second piece of said seat back are extended relative to one another to increase seat back area for sitting, wherein, in a second backrest position, said first piece of said seat back and said second piece of said seat back are retracted relative to one another for storage; and, an extendable and retractable footrest depending from said seat bottom and attached with a sliding and pivoting connection such that said footrest and said seat bottom have a first footrest position and a second footrest position, wherein, in transitioning to said first footrest position, said footrest is extended away from said seat bottom for use as a footrest during sitting, wherein, in said second footrest position, said footrest is retracted slides along a longitudinal axis of the seat while pivoting upward toward said seat bottom for storage.

\* \* \* \* \*